(12) United States Patent
Watanabe et al.

(10) Patent No.: US 10,808,976 B2
(45) Date of Patent: Oct. 20, 2020

(54) AIR-CONDITIONING APPARATUS

(71) Applicant: Mitsubishi Electric Corporation, Chiyoda-ku (JP)

(72) Inventors: Kazuya Watanabe, Chiyoda-ku (JP); Shinichi Wakamoto, Chiyoda-ku (JP); Naofumi Takenaka, Chiyoda-ku (JP); Naomichi Tamura, Chiyoda-ku (JP); Tadashi Ariyama, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 29 days.

(21) Appl. No.: 16/088,877

(22) PCT Filed: May 16, 2016

(86) PCT No.: PCT/JP2016/064488
§ 371 (c)(1),
(2) Date: Sep. 27, 2018

(87) PCT Pub. No.: WO2017/199289
PCT Pub. Date: Nov. 23, 2017

(65) Prior Publication Data
US 2019/0107314 A1    Apr. 11, 2019

(51) Int. Cl.
*F25B 47/02* (2006.01)
*F24F 11/72* (2018.01)
(Continued)

(52) U.S. Cl.
CPC ............ *F25B 47/025* (2013.01); *F24F 11/41* (2018.01); *F24F 11/72* (2018.01); *F25B 13/00* (2013.01);
(Continued)

(58) Field of Classification Search
CPC ...... F25B 47/025; F25B 41/04; F25B 47/022; F25B 2313/02322; F25B 2313/0251;
(Continued)

(56) References Cited

U.S. PATENT DOCUMENTS 5,046,323 A * 9/1991 Kuwahara ............... F24F 3/065
62/140
2011/0232308 A1  9/2011 Morimoto et al.
(Continued)

FOREIGN PATENT DOCUMENTS

CN    102272534 A    12/2011
CN    103245152 A    8/2013
(Continued)

OTHER PUBLICATIONS

Office Action dated Apr. 1, 2020 in Chinese Patent Application No. 201680085562.8, 19 pages.
(Continued)

*Primary Examiner* — Larry L Furdge
(74) *Attorney, Agent, or Firm* — Xsensus LLP

(57) ABSTRACT

An air-conditioning apparatus includes: a first defrosting pipe branching from a main circuit to supply a portion of refrigerant discharged from a compressor to one of plural parallel heat exchangers to be defrosted; a second defrosting pipe which returns, to the main circuit, the refrigerant supplied through the first defrosting pipe to the one parallel heat exchanger; a first expansion device provided on the first defrosting pipe; a second expansion device provided on the second defrosting pipe to adjust a pressure of the refrigerant in the one parallel heat exchanger; and a third expansion device provided between a connection point between an outlet of the second defrosting pipe and the main circuit and one of plural indoor heat exchangers functioning as an evaporator, to adjust a pressure of the refrigerant in the one (Continued)

of the indoor heat exchangers; and a controller that controls the second and third expansion devices individually.

11 Claims, 12 Drawing Sheets

(51) Int. Cl.
  *F25B 41/04* (2006.01)
  *F24F 11/41* (2018.01)
  *F25B 13/00* (2006.01)
  *F25B 41/06* (2006.01)
  *F24F 140/20* (2018.01)
  *F24F 140/12* (2018.01)
  *F24F 110/10* (2018.01)

(52) U.S. Cl.
  CPC ............ *F25B 41/04* (2013.01); *F25B 41/062* (2013.01); *F25B 47/022* (2013.01); *F24F 2110/10* (2018.01); *F24F 2140/12* (2018.01); *F24F 2140/20* (2018.01); *F24F 2221/54* (2013.01); *F25B 2313/0231* (2013.01); *F25B 2313/0251* (2013.01); *F25B 2313/0272* (2013.01); *F25B 2313/02522* (2013.01); *F25B 2313/0314* (2013.01); *F25B 2341/0661* (2013.01); *F25B 2600/2513* (2013.01)

(58) Field of Classification Search
  CPC .. F25B 2313/02522; F25B 2313/02532; F25B 2313/02542; F24F 2221/54; F24F 11/41; F24F 11/72; F24F 2110/10
  See application file for complete search history.

(56) References Cited

U.S. PATENT DOCUMENTS

2015/0292789 A1* 10/2015 Takenaka .............. F25B 47/022
                                                      62/140
2016/0116202 A1*  4/2016 Takenaka .............. F25D 21/002
                                                      62/140

FOREIGN PATENT DOCUMENTS

| JP | 2011-112233 A | 6/2011 |
| WO | WO 2010/082325 A1 | 7/2010 |
| WO | WO 2014/083867 A1 | 6/2014 |

OTHER PUBLICATIONS

International Search Report dated Aug. 9, 2016 in PCT/JP2016/064488 filed May 16, 2016.

* cited by examiner

FIG. 3

| VALVE NUMBER | COOLING ONLY OPERATION, COOLING MAIN OPERATION | HEATING ONLY OPERATION, HEATING MAIN OPERATION | | |
|---|---|---|---|---|
| | | NORMAL HEATING ONLY OPERATION, NORMAL HEATING MAIN OPERATION | HEATING ONLY DEFROSTING OPERATION, HEATING MAIN DEFROSTING OPERATION | |
| | | | 3-1: EVAPORATOR 3-2: DEFROSTED | 3-1: DEFROSTED 3-2: EVAPORATOR |
| 2 | OFF | ON | ON | ON |
| 5-1 | ON | OFF | OFF | OFF |
| 5-2 | ON | OFF | OFF | OFF |
| 5-3 | OFF | ON | ON | ON |
| 5-4 | OFF | ON | ON | ON |
| 6-1 | ON | ON | ON | OFF |
| 6-2 | ON | ON | OFF | ON |
| 7-1 | FULLY OPENED | CONSTANT OPENING DEGREE, PRESSURE IN HEAT EXCHANGER FOR COOLING | PRESSURE IN HEAT EXCHANGER FOR COOLING | CLOSED |
| 7-2 | FULLY OPENED | CONSTANT OPENING DEGREE, PRESSURE IN HEAT EXCHANGER FOR COOLING | CLOSED | PRESSURE IN HEAT EXCHANGER FOR COOLING |
| 8 | CLOSED | CLOSED | FIXED OPENING DEGREE | FIXED OPENING DEGREE |
| 9-1 | OFF | OFF | OFF | ON |
| 9-2 | OFF | OFF | ON | OFF |
| 10 | CLOSED | CLOSED | PRESSURE IN HEAT EXCHANGER TO BE DEFROSTED | PRESSURE IN HEAT EXCHANGER TO BE DEFROSTED |

FIG. 4

| VALVE NUMBER | COOLING ONLY OPERATION | COOLING MAIN OPERATION, HEATING MAIN OPERATION | | HEATING ONLY OPERATION |
|---|---|---|---|---|
| | | B: COOLING C: HEATING | B: HEATING C: COOLING | |
| 12b | DEGREE OF SUPERHEAT OF REFRIGERANT AT OUTLET OF INDOOR HEAT EXCHANGER | DEGREE OF SUPERHEAT OF REFRIGERANT AT OUTLET OF INDOOR HEAT EXCHANGER | DEGREE OF SUBCOOLING OF REFRIGERANT AT OUTLET OF INDOOR HEAT EXCHANGER | DEGREE OF SUBCOOLING OF REFRIGERANT AT OUTLET OF INDOOR HEAT EXCHANGER |
| 12c | DEGREE OF SUPERHEAT OF REFRIGERANT AT OUTLET OF INDOOR HEAT EXCHANGER | DEGREE OF SUBCOOLING OF REFRIGERANT AT OUTLET OF INDOOR HEAT EXCHANGER | DEGREE OF SUPERHEAT OF REFRIGERANT AT OUTLET OF INDOOR HEAT EXCHANGER | DEGREE OF SUBCOOLING OF REFRIGERANT AT OUTLET OF INDOOR HEAT EXCHANGER |

FIG. 5

| VALVE NUMBER | COOLING ONLY OPERATION | SIMULTANEOUS COOLING AND HEATING OPERATION (COOLING MAIN OPERATION, HEATING MAIN OPERATION) | | HEATING ONLY OPERATION |
|---|---|---|---|---|
| | | B: COOLING C: HEATING | B: HEATING C: COOLING | |
| 14b | OFF | OFF | ON | ON |
| 14c | OFF | ON | OFF | ON |
| 15b | ON | ON | OFF | OFF |
| 15c | ON | OFF | ON | OFF |
| 16 | FULLY OPENED | FLOW RATE OF PASSING REFRIGERANT, DIFFERENCE BETWEEN PRESSURE BEFORE PASSAGE OF REFRIGERANT AND AFTER PASSING OF REFRIGERANT | FLOW RATE OF PASSING REFRIGERANT, DIFFERENCE BETWEEN PRESSURE BEFORE PASSAGE OF REFRIGERANT AND AFTER PASSING OF REFRIGERANT | CLOSED |
| 17 | FLOW RATE OF PASSING REFRIGERANT, DIFFERENCE BETWEEN PRESSURE BEFORE PASSAGE OF REFRIGERANT AND AFTER PASSING OF REFRIGERANT | FLOW RATE OF PASSING REFRIGERANT, DIFFERENCE BETWEEN PRESSURE BEFORE PASSAGE OF REFRIGERANT AND AFTER PASSING OF REFRIGERANT | FLOW RATE OF PASSING REFRIGERANT, DIFFERENCE BETWEEN PRESSURE BEFORE PASSAGE OF REFRIGERANT AND AFTER PASSING OF REFRIGERANT | FULLY OPENED |

AIR-CONDITIONING APPARATUS

TECHNICAL FIELD

The present invention relates to an air-conditioning apparatus capable of performing defrosting while continuing a heating operation.

BACKGROUND ART

In recent years, from the viewpoint of protection of the global environment, larger number of boiler-based heating apparatuses which perform heating by burning fossil fuels have been substituted with heat-pump-based air-conditioning apparatuses which use air as a heat source, even in cold climate areas. The heat-pump-based air-conditioning apparatuses supply an electrical input to a compressor and receives heat from air, and are therefore capable of performing heating with high efficiency. However, when the outside temperature is low, frost forms on an outdoor heat exchanger, which serves as an evaporator, and it is therefore necessary to perform defrosting to melt the frost on the outdoor heat exchanger.

Defrosting can be performed by reversing the flow of refrigerant in a refrigeration cycle with respect to that in the heating operation. However, according to this method, heating of an indoor space is stopped during defrosting. As a result, the comfortability is impaired. Therefore, methods for performing heating during defrosting have been proposed. For example, an outdoor heat exchanger is made up of a plurality of parallel heat exchangers, and even when one or more of the parallel heat exchangers are defrosted, heating can be performed by causing the other parallel heat exchangers to function as evaporators that receive heat from air (see, for example, Patent Literatures 1 and 2).

According to the technique described in Patent Literature 1, in an air-conditioning apparatus of a cooling-heating switching type that can performing either heating or cooling, an outdoor heat exchanger is made up of a plurality of parallel heat exchangers. The parallel heat exchangers are alternately made to receive a portion of high-temperature refrigerant discharged from a compressor, and alternately defrosted, whereby heating is continuously performed without reversing the refrigeration cycle.

According to the technique described in Patent Literature 2, a simultaneous heating and cooling air-conditioning apparatus includes indoor units which are each capable of performing either heating or cooling. According to Patent Literature 2, an outdoor heat exchanger is made up of a plurality of parallel heat exchangers. Thus, and one or more of the parallel heat exchangers can be defrosted, and at the same time heating is continuously performed without reversing the refrigeration cycle.

CITATION LIST

Patent Literature

Patent Literature 1: International Publication No. 2014/083867
Patent Literature 2: International Publication No. 2010/082325

SUMMARY OF INVENTION

Technical Problem

The air-conditioning apparatus described in Patent Literature 1 is not capable of performing cooling and heating simultaneously. Therefore, if an operation request for cooling and that for heating are both made from individual indoor spaces, the air-conditioning apparatus cannot respond to the operation requests, and as a result the comfortability of the indoor spaces is impaired.

The air-conditioning apparatus described in Patent Literature 2 is capable of performing a simultaneous cooling and heating operation (cooling and heating mixed operation) in which cooling and heating are simultaneously carried out, and is therefore capable of operating in response to operation requests from individual indoor spaces. However, the pressure of refrigerant for defrosting is set to either a low pressure equivalent to the pressure of refrigerant that receives heat from outside air or a high pressure equivalent to the pressure in a condenser, and cannot be adjusted to any other pressures. Therefore, when the saturation temperature of the refrigerant for defrosting is lower than the melting temperature of frost, defrosting cannot be performed with latent heat of the refrigerant, and is performed with sensible heat. Since the sensible heat is less than the latent heat, it is necessary to increase the flow rate of refrigerant made to flow into the parallel heat exchangers to be defrosted, in order that the same capacity of melting frost in defrosting with the latent heat be obtained in defrosting with the sensible heat. When the flow rate of the refrigerant made to flow into the parallel heat exchangers to be defrosted is increased, the amount of refrigerant that flows into the parallel heat exchangers for heating becomes insufficient, and the heating capacity is reduced. When the pressure of the refrigerant for defrosting is high, the amount of liquid refrigerant in the parallel heat exchangers to be defrosted is increased. Therefore, the amount of refrigerant for heating is insufficient, and the heating capacity is reduced.

In such a manner, in the case where the pressure cannot be adjusted during defrosting as described above, the heating capacity is reduced, and the comfortability of the indoor spaces is impaired.

The air-conditioning apparatus according to Patent Literature 2 is capable of performing defrosting while performing the simultaneous cooling and heating operation. However, the pressure of refrigerant for cooling cannot be adjusted. Therefore, the indoor temperature cannot be reduced to a set cooling temperature, and the comfortability of the indoor spaces may be impaired.

The present invention has been made to solve the above problems, and an object of the present invention is to provide a simultaneous heating and cooling air-conditioning apparatus which can perform defrosting without stopping heating in a simultaneous cooling and heating operation, in which cooling and heating are simultaneously carried out, and which can also improve the comfortability of both indoor spaces that are cooled and heated.

Solution to Problem

An air-conditioning apparatus according to an embodiment of the present invention includes a main circuit including a compressor, a plurality of indoor heat exchangers, a plurality of pressure reducing devices, and an outdoor heat exchanger that are successively connected by pipes, the outdoor heat exchanger including a plurality of parallel heat exchangers; a first defrosting pipe branching off from the main circuit to supply a portion of refrigerant discharged from the compressor to one of a plurality of parallel heat exchangers which is to be defrosted; a first expansion device provided on the first defrosting pipe to return to the main circuit, the refrigerant supplied through the first defrosting pipe to the parallel heat exchanger to be defrosted; a first flow switching device which switches connection of each of the parallel heat exchangers on an end side thereof connected to the compressor, between connection to the first defrosting pipe and connection to the main circuit; a second flow switching device which switches connection of each of the parallel heat exchangers on an opposite end side of the end side connected to the compressor, between connection to the second defrosting pipe and connection to the main circuit; a second expansion device provided on the second defrosting pipe to adjust a pressure of the refrigerant in the parallel heat exchanger to be defrosted; a third expansion device which is provided between a connection point between an outlet of the second defrosting pipe and the main circuit and one of the indoor heat exchangers which functions as an evaporator, and which adjusts a pressure of the refrigerant in the one of the indoor heat exchangers that functions as the evaporator; and a controller which controls the first expansion device, the second expansion device, and the third expansion device. The controller controls the second expansion device and the third expansion device individually in a first operation in which: the portion of the refrigerant discharged from the compressor is guided through the first defrosting pipe and the second defrosting pipe to pass through the parallel heat exchanger to be defrosted; one or ones of the parallel heat exchangers which are other than the parallel heat exchanger to be defrosted function as evaporators; and the one or ones of the indoor heat exchangers are caused to functions as evaporators, and an other one or other ones of the indoor heat exchangers are caused to function as condensers.

Advantageous Effects of Invention

According to the present invention, defrosting can be performed without stopping heating in a simultaneous cooling and heating operation in which cooling and heating are simultaneously carried out. In addition, since a second expansion device and a third expansion device are individually controlled, the comfortability of both indoor spaces that are cooled and heated can be improved.

BRIEF DESCRIPTION OF DRAWINGS

FIG. 3 is a table illustrating the states of opening/closing devices, flow-rate control devices and expansion devices included in an outdoor unit A as illustrated in FIG. 1 in each of operation modes.

FIG. 4 is a table illustrating the states of flow-rate control devices included in indoor units B and C as illustrated in FIG. 1.

FIG. 5 is a table illustrating the states of opening/closing devices and flow-rate control devices included in a relay device D illustrated in FIG. 1 in each operation mode.

DESCRIPTION OF EMBODIMENTS

Figure 1:
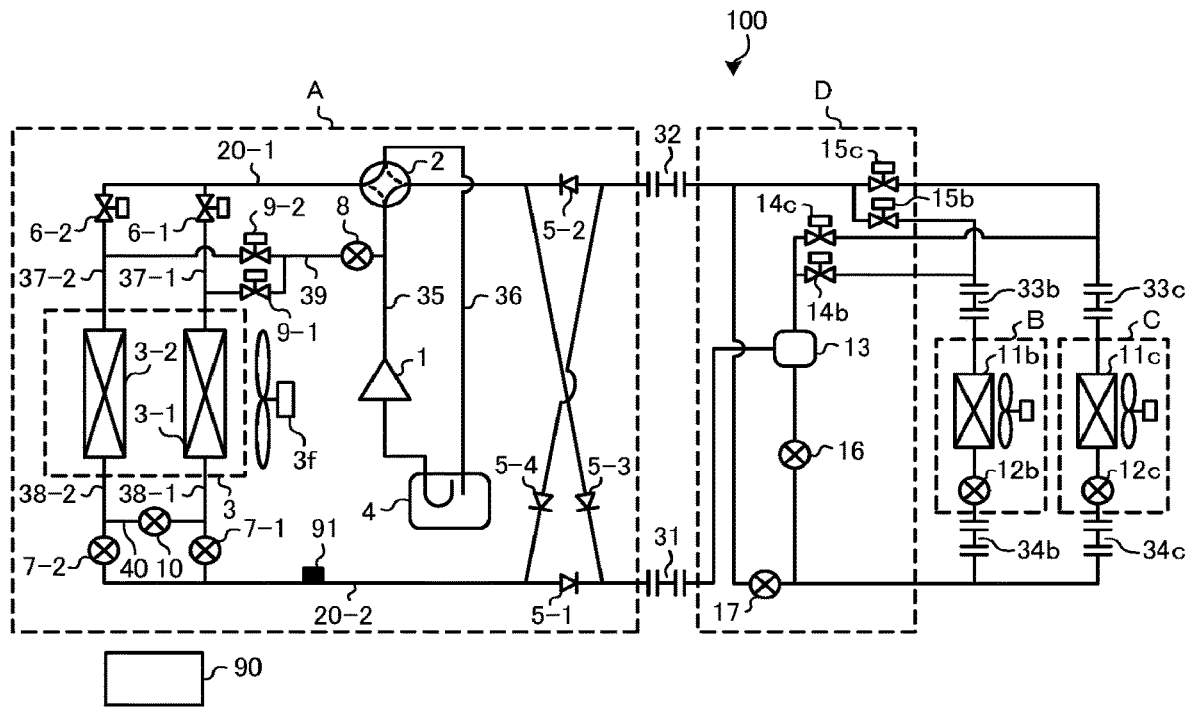
FIG. 1 is a refrigerant circuit diagram illustrating the configuration of a refrigerant circuit of an air-conditioning apparatus 100 according to Embodiment 1 of the present invention.

Embodiments 1 to 3 of the present invention will be described with reference to the drawings.

In the drawings and the specification, elements denoted by the same reference signs are the same or similar elements. The configurations of the elements described in the specification are merely examples, and do not constitute any limitation.

Embodiment 1

FIG. 1 is a refrigerant circuit diagram illustrating the configuration of a refrigerant circuit of an air-conditioning apparatus 100 according to Embodiment 1.

The air-conditioning apparatus 100 includes an outdoor unit (heat source device, heat source-side unit) A, a plurality of indoor units (load-side units) B and C that are connected to each other in parallel, and a relay device D. The outdoor unit A and the relay device D are connected to each other by a first extension pipe 31 and a second extension pipe 32, and the first extension pipe 31 is a high-pressure pipe, and the second extension pipe 32 is a low-pressure pipe. The relay device D is connected to the indoor units B and C by third extension pipes 33*b* and 33*c* and fourth extension pipes 34*b* and 34*c*.

The air-conditioning apparatus 100 further includes a controller 90. The controller 90 controls, for example, switching between cooling and heating with respect to the operation of each of the indoor units B and C, changing of a set temperature, and operations of opening-and-closing devices, flow-rate control devices, expansion devices, etc., which will be described below. The controller 90 has a function of performing switching between operation modes by controlling, for example, the opening-and-closing devices, the flow-rate control devices, and the expansion devices. The controller 90 can be made of a hardware component such as a circuit device that can fulfill the function of the controller 90. Alternatively, the controller 90 can also be made up of an arithmetic unit such as a microcomputer or a CPU, and software to be executed by the arithmetic unit. The operation modes of the air-conditioning apparatus 100 include a cooling mode in which a cooling operation is performed and a heating mode in which a heating operation is performed. The cooling operation includes a cooling only operation and a cooling main operation, and the heating operation include a heating only operation and a heating main operation. These operation modes will be described in detail below.

As the refrigerant, fluorocarbon refrigerant or HFO refrigerant is applied. As the fluorocarbon refrigerant, for example, R32 refrigerant, R125 and R134*a*, which are HFC-based refrigerants, and mixtures of these refrigerants, such as R410A, R407*c* and R404A, are present. As the HFO refrigerant, for example, HFO-1234yf, HFO-1234ze(E) and HFO-1234ze(Z) are present. As other examples of the refrigerant, $CO_2$ refrigerant, HC refrigerant (e.g., propane or isobutane refrigerant), ammonia refrigerant, and mixtures of the above-mentioned refrigerants, such as a mixture of R32 and HFO-1234yf, are present, which are applied to vapor compression heat pumps.

Embodiment 1 will be described by referring to by way of example the case where two indoor units B and C are connected to a single outdoor unit A. However, the number of indoor units may be three or more, and two or more outdoor units may be connected in parallel.

The configuration of the refrigerant circuit of the air-conditioning apparatus 100 will be described.

The air-conditioning apparatus 100 includes a main circuit in which a compressor 1, indoor heat exchangers 11*b* and 11*c*, indoor flow-rate control devices 12*b* and 12*c*, which are pressure reducing devices, and an outdoor heat exchanger 3, which includes parallel heat exchangers 3-1 and 3-2, are successively connected by pipes.

[Outdoor Unit A]

The outdoor unit A includes the compressor 1, a flow switching device 2, the outdoor heat exchanger 3, an accumulator 4, and backflow preventing devices 5-1, 5-2, 5-3 and 5-4. These components are connected to each other by pipes to form a circuit, which corresponds to part of the main circuit. The accumulator 4 is not necessarily indispensable, and may be omitted.

The flow switching device 2 is connected between a discharge pipe 35 and a suction pipe 36 of the compressor 1. As the flow switching device 2, for example, a four-way valve which changes the flowing direction of the refrigerant is applied. The direction of the above connection is either a direction indicated by solid lines in FIG. 1 or a direction indicated by broken lines therein.

As each of the backflow preventing devices 5-1, 5-2, 5-3 and 5-4, for example, a check valve which restricts the flowing direction of the refrigerant to one direction is applied. The backflow preventing device 5-2, for example, restricts the flowing direction of the refrigerant to a direction from the second extension pipe 32 toward the flow switching device 2, and does not allow the refrigerant to flow in the opposite direction of the above direction. Each of the backflow preventing devices 5-1, 5-2, 5-3 and 5-4 may be any device as long as it can restrict the flowing direction of the refrigerant to a single direction. As each backflow preventing device, for example, an opening-and-closing device or an expansion device having a fully closing function may be applied.

Figure 2:
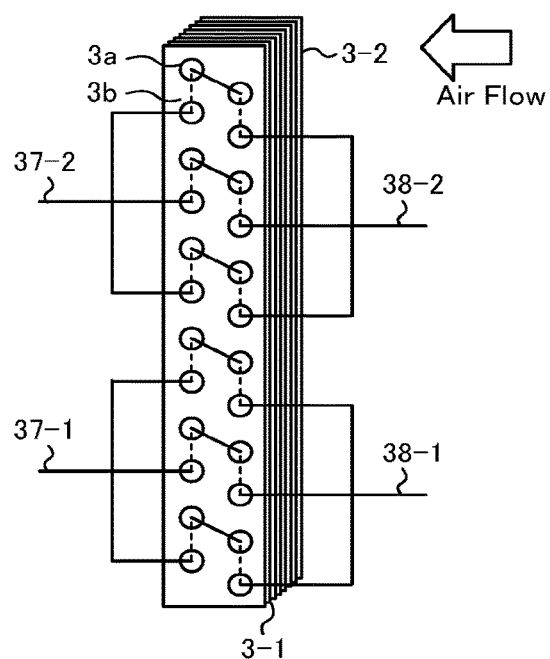
FIG. 2 illustrates an exemplary structure of an outdoor heat exchanger 3 included in the air-conditioning apparatus 100 according to Embodiment 1.

FIG. 2 illustrates an example of the configuration of the outdoor heat exchanger 3 included in the air-conditioning apparatus 100 according to Embodiment 1.

As illustrated in FIG. 2, as the outdoor heat exchanger 3, for example, a fin-and-tube heat exchanger including a plurality of heat transfer tubes 3*a* and a plurality of fins 3*b* is applied. The outdoor heat exchanger 3 is divided into a plurality of parallel heat exchangers. In example illustrated in the figure, the outdoor heat exchanger 3 is divided into two parallel heat exchangers 3-1 and 3-2. The number of parallel heat exchangers included in the outdoor heat exchanger 3 is not limited to two, and can be arbitrarily determined.

The heat transfer tubes 3*a* allow the refrigerant to flow therethrough, and are arranged in a column direction, which is perpendicular to the flow direction of air, and are also arranged in a row direction, which is the flow direction of air.

The fins 3*b* are arranged with gaps provided therebetween to allow air to flow in the flow direction of air.

In the housing of the outdoor unit A, the outdoor heat exchanger 3 is divided into the parallel heat exchangers 3-1 and 3-2. In this case, the outdoor heat exchanger 3 may be divided into parallel heat exchangers 3-1 and 3-2 on left and right sides of FIG. 2, or it may be divided into parallel heat exchangers 3-1 and 3-2 on upper and lower sides of FIG. 2 as illustrated in FIG. 2. In the case where the outdoor heat exchanger 3 is divided into the parallel heat exchangers 3-1 and 3-2 on its left and right sides, refrigerant inlets of the parallel heat exchangers 3-1 and 3-2 are arranged on left and right end sides of the outdoor unit A, and therefore the connection of the pipes is complexed; however, water generated during defrosting does not adhere to other heat exchangers. By contrast, in the case where the outdoor heat exchanger 3 is divided into the parallel heat exchangers 3-1 and 3-2 on the upper and lower sides, the connection of the pipes is easier.

It should be noted that the fins 3*b* of the parallel heat exchanger 3-1 may be formed continuous with the fins 3*b* of the parallel heat exchanger 3-2 as illustrated in FIG. 2. Alternatively, the fins 3*b* of the parallel heat exchanger 3-1 may be formed separate from the fins 3*b* of the parallel heat exchanger 3-2. The fins 3*b* of the parallel heat exchangers 3-1 and 3-2 may be formed to include a mechanism for reducing heat leakage. Alternatively, a heat transfer tube for flowing of high-temperature refrigerant may be provided between the parallel heat exchangers 3-1 and 3-2. The mechanism for reducing heat leakage, which is included in the fins 3*b*, correspond to, for example, cuts or slits. In such a manner, by forming the fins 3*b* of the above two parallel heat exchanger such that the fins 3b of one of the parallel heat exchangers are separate from the fins 3b of the other parallel heat exchanger, or by providing the mechanism for reducing heat leakage or the heat transfer tube for flowing of high-temperature refrigerant, it is possible to reduce heat leakage from a parallel heat exchanger to be defrosted to a parallel heat exchanger functioning as an evaporator. If heat leakage occurs, it becomes difficulty to defrost the boundary between the parallel heat exchanger to be defrosted and the parallel heat exchanger functioning as an evaporator. However, such a difficulty in defrosting does not occur by reducing heat leakage.

Indoor air is sent by an outdoor fan 3f toward the parallel heat exchangers 3-1 and 3-2.

With respect to the outdoor fan 3f, the parallel heat exchangers 3-1 and 3-2 may include respective outdoor fans 3f or include only one single fan 3f as illustrated in FIG. 1.

First connection pipes 37-1 and 37-2 are connected to sides of the parallel heat exchangers 3-1 and 3-2 that are connected to the compressor 1. The first connection pipes 37-1 and 37-2 are connected in parallel to a pipe 20-1 which extends from a connection port of the flow switching device 2 that is connected to the outdoor heat exchanger 3, and are provided with respective first opening-and-closing devices 6-1 and 6-2.

Second connection pipes 38-1 and 38-2 are connected to sides of the parallel heat exchangers 3-1 and 3-2 which are opposite to their sides connected to the compressor 1. The second connection pipes 38-1 and 38-2 are connected in parallel to a pipe 20-2 which extends from the first extension pipe 31 toward the outdoor unit A, and are provided with respective flow-rate control devices 7-1 and 7-2.

The flow-rate control devices 7-1 and 7-2 are capable of changing the opening degrees thereof in response to a command from the controller 90. As the flow-rate control devices 7-1 and 7-2, for example, electronically controlled expansion valves are applied.

The outdoor unit A further includes a first defrosting pipe 39 and a second defrosting pipe 40 through which the refrigerant passes when defrosting is performed. One of the ends of the first defrosting pipe 39 is connected to the discharge pipe 35, and the other is branched into pipes which are connected to the respective first connection pipes 37-1 and 37-2. The first defrosting pipe 39 causes a portion of high-temperature high-pressure refrigerant discharged from the compressor 1 to flow out of the main circuit, and enter a defrosting heat exchanger, which corresponds to one of the parallel heat exchangers 3-1 and 3-2 that is to be defrosted. One of the ends of the second defrosting pipe 40 is connected to the second connection pipe 38-2 between the parallel heat exchanger 3-1 and the flow-rate control device 7-1, and the other is connected to the second connection pipe 38-2 between the parallel heat exchanger 3-2 and the flow-rate control device 7-2. The second defrosting pipe 40 returns the refrigerant that flows out of the defrosting heat exchanger to the main circuit.

The first defrosting pipe 39 is provided with a first expansion device 8, which reduce the pressure of a portion of the high-temperature high-pressure refrigerant discharged from the compressor 1 to an intermediate pressure. It should be noted that the intermediate pressure is a pressure which is lower than a pressure of a high-pressure side of the refrigerant circuit and higher than a pressure of a low-pressure side thereof (for example, the internal pressure of an evaporator). The pressure of the high-pressure side is, for example, the internal pressure of a condenser. The pressure of the low pressure is, for example, the internal pressure of an evaporator that receives heat from outside air. An internal-pressure refrigerant having the intermediate pressure to which the pressure of the portion of the high-temperature high-pressure refrigerant has been reduced by the first expansion device 8 passes through the first connection pipes 37-1 and 37-2 and flows into the parallel heat exchangers 3-1 and 3-2. Thus, the parallel heat exchangers 3-1 and 3-2 are defrosted using the intermediate-pressure refrigerant.

The pipes into which the first defrosting pipe 39 is branched are provided with second opening-and-closing devices 9-1 and 9-2. The second opening-and-closing devices 9-1 and 9-2 control the intermediate-pressure refrigerant to flow into one of the first connection pipes 37-1 and 37-2. The second opening-and-closing devices 9-1 and 9-2 and the first opening-and-closing devices 6-1 and 6-2 form a "first flow switching device" of the present invention.

The second defrosting pipe 40 is provided with a second expansion device 10, which reduces to a low pressure the pressure of the refrigerant which flows out of one of the parallel heat exchangers 3-1 and 3-2 that is defrosted.

The first opening-and-closing devices 6-1 and 6-2 and the second opening-and-closing devices 9-1 and 9-2 may be any devices as long as they can open and close flow passages, and are formed of, for example, solenoid valves, four-way valves, three-way valves, or two-way valves. The second expansion device 10 is a device capable of changing the opening degree thereof in response to an instruction from the controller 90, and is formed of, for example, an electronically controlled expansion valve.

If a required defrosting performance, that is, the flow rate of the refrigerant required for defrosting, is predetermined, the first expansion device 8 may be formed of capillary tubes. Alternatively, the first expansion device 8 may be omitted, and the second opening-and-closing devices 9-1 and 9-2 may be made more compact in order that the pressure be reduced from the high pressure to the intermediate pressure by causing the refrigerant to flow at a preset defrosting flow rate. Alternatively, the first expansion device 8 may be omitted, and flow-rate control devices may be provided instead of the second opening-and-closing devices 9-1 and 9-2.

A refrigerant pressure sensor 91 which detects the pressure of the refrigerant in an indoor heat exchanger which functions as an evaporator is disposed between the backflow preventing device 5-4 and the flow-rate control devices 7-1 and 7-2. The refrigerant pressure sensor 91 may be disposed at any position as long as it can detect the pressure of the refrigerant in one of the indoor heat exchangers 11b and 11c which functions as an evaporator. For example, the refrigerant pressure sensor 91 may be disposed at any position in the outdoor unit A, the indoor units B and C or the relay device D as long as it is located between the indoor heat exchangers 11b and 11c and the flow-rate control devices 7-1 and 7-2.

The refrigerant pressure sensor 91 is used to detect the pressure of the refrigerant which is in a two-phase gas-liquid state. Therefore, a temperature sensor capable of detecting the temperature of the refrigerant may be used, and the detected temperature may be converted into the pressure of the refrigerant on the assumption that the detected temperature is the saturation temperature. In the case where a temperature sensor which detects the temperature of the refrigerant is used, the temperature of the refrigerant may be directly detected, with the temperature sensor brought into contact with the refrigerant, or be indirectly detected by detecting the temperature of the external surface of, for example, a pipe or a heat exchanger. Alternatively, a temperature sensor capable of detecting the temperature of air may be attached to an indoor unit including an indoor heat exchanger functioning as an evaporator, and the temperature of air at the outlet of the indoor heat exchanger functioning as an evaporator may be detected using the temperature sensor, and converted into the pressure of the refrigerant.

It should be noted that in Embodiment 1, the first expansion device 8 corresponds to a "first expansion device" according to the present invention, and the second expansion device 10 corresponds to a "second expansion device" according to the present invention. The flow-rate control devices 7-1 and 7-2 collectively correspond to a "flow control device" according to the first embodiment. The first defrosting pipe 39 corresponds to a "first defrosting pipe" according to the present invention, and the second defrosting pipe 40 corresponds to a "second defrosting pipe" according to the present invention. The refrigerant pressure sensor 91 corresponds to a "pressure detection device" according to the present invention.

[Indoor Unit B and Indoor Unit C]

The indoor unit B and the indoor unit C have, for example, the same configuration. The indoor unit B includes the indoor heat exchanger 11b and the indoor flow-rate control device 12b. The indoor unit C includes the indoor heat exchanger 11c and the indoor flow-rate control device 12c. Devices included in the indoor unit B and devices included in the indoor unit C are connected by pipes to form a circuit which corresponds to part of the main circuit. The indoor flow-rate control device 12b and the indoor flow-rate control device 12c correspond to a "pressure reducing device" according to the present invention.

The indoor flow-rate control devices 12b and 12c are devices capable of changing the opening degrees thereof, and are formed of, for example, electronically controlled expansion valves. The indoor flow-rate control devices 12b and 12c are located upstream of the indoor heat exchangers 11b and 11c in the direction in which the refrigerant flows in the cooling only operation.

[Relay Device D]

The relay device D includes a gas-liquid separation device 13, first relay opening-and-closing devices 14b and 14c, second relay opening-and-closing devices 15b and 15c, a first relay flow-rate control device 16, and a second relay flow-rate control device 17. These devices are connected by pipes to form a circuit which corresponds to part of the main circuit.

The gas-liquid separation device 13 separates the refrigerant which flows out of the first extension pipe 31 into gas refrigerant and liquid refrigerant. A gas phase portion of the gas-liquid separation device 13, from which the gas refrigerant is discharged, is connected to the third extension pipes 33b and 33c through the first relay opening-and-closing devices 14b and 14c. A liquid phase portion of the gas-liquid separation device 13, from which the liquid refrigerant is discharged, is connected to the second relay flow-rate control device 17 and the fourth extension pipes 34b and 34c through the first relay flow-rate control device 16.

The second relay opening-and-closing device 15b is connected between the second extension pipe 32 and the third extension pipe 33b, and the second relay opening-and-closing devices 15c is connected between the second extension pipe 32 and the third extension pipe 33c.

The second relay flow-rate control device 17 is provided on a pipe which branches from the passage between the first relay flow-rate control device 16 and the fourth extension pipes 34b and 34c and which is connected to the passage between the second extension pipe 32 and the second relay opening-and-closing devices 15b and 15c.

The first relay opening-and-closing devices 14b and 14c and the second relay opening-and-closing devices 15b and 15c may be any devices as long as they can open and close flow passages, and are formed of, for example, solenoid valves, four-way valves, three-way valves, or two-way valves. The first relay flow-rate control device 16 and the second relay flow-rate control device 17 are devices capable of changing the opening degrees thereof, and are formed of, for example, electronically controlled expansion valves.

The first relay opening-and-closing devices 14b and 14c and the second relay opening-and-closing devices 15b and 15c according to Embodiment 1 correspond to a "connection switching device" according to the present invention.

Each of the operations performed by the air-conditioning apparatus 100 will now be described.

The air-conditioning apparatus 100 has four operation modes: a cooling only operation in which the outdoor heat exchanger 3 functions as a condenser; a cooling main operation; a heating only operation in which the outdoor heat exchanger 3 functions as an evaporator; and a heating main operation. The heating only operation is an operation in which all of the indoor units perform heating only. The cooling only operation is an operation in which all of the indoor units perform cooling only. The cooling main operation and the heating main operation are simultaneous cooling and heating operations in which one or ones of the indoor units perform heating and the other or others of the indoor units perform cooling. The cooling main operation is performed when a cooling load is greater than a heating load, and the heating main operation is performed when the heating load is greater than the cooling load.

The cooling load and the heating load can be found out by, for example, detecting the pressure of the refrigerant discharged from the compressor 1, the pressure of the refrigerant sucked into the compressor 1, the capacities and number of indoor units being in operation and differences between set indoor temperatures and actual indoor temperatures. These information items for finding out the cooling load and the heating load can be obtained by the controller 90.

The heating only operation includes a normal heating only operation in which the parallel heat exchangers 3-1 and 3-2 of the outdoor heat exchanger 3 both function as evaporators, and a heating only defrosting operation (also referred to as a continuous heating only operation) in which one of the parallel heat exchangers 3-1 and 3-2 functions as an evaporator. The heating main operation includes a normal heating main operation in which the parallel heat exchangers 3-1 and 3-2 of the outdoor heat exchanger 3 both function as evaporators, and a heating main defrosting operation (also referred to as a continuous heating main operation) in which one of the parallel heat exchangers 3-1 and 3-2 functions as an evaporator. The heating main defrosting operation corresponds to a "first operation" according to the present invention, and the normal heating main operation corresponds to a "second operation" according to the present invention.

In the heating only defrosting operation and the heating main defrosting operation, the parallel heat exchanger 3-1 and the parallel heat exchanger 3-2 are alternately defrosted while heating is being continued. More specifically, one of the parallel heat exchangers is caused to function as an evaporator to perform heating, whereas the other is defrosted. When the other parallel heat exchanger has defrosted, it is caused to function as an evaporator to perform heating, whereas the above one of the parallel heat exchangers is defrosted.

FIGS. 3, 4, and 5 are tables indicating examples of controls of the valves in each of the operation modes of the air-conditioning apparatus 100 as illustrated in FIG. 1. FIG. 3 is a table indicating the states of the opening-and-closing devices, the flow-rate control devices and the expansion devices included in the outdoor unit A as illustrated in FIG. 1 in each operation mode. FIG. 4 is a table illustrating the states of the flow-rate control devices included in the indoor units B and C as illustrated in FIG. 1. FIG. 5 is a table illustrating the states of the opening-and-closing devices and the flow-rate control devices included in the relay device D as illustrated in FIG. 1 in each operation mode. In FIG. 3, with respect to the flow switching device 2, "ON" means that the connection is established in the direction indicated by the solid lines in FIG. 1, and "OFF" means that the connection is established in the direction indicated by the dotted lines in FIG. 1. In FIG. 3, with respect to the first opening-and-closing devices 6-1 and 6-2 and the second opening-and-closing devices 9-1 and 9-2, and in FIG. 5, with respect to the first relay opening-and-closing devices 14b and 14c and the second relay opening-and-closing devices 15b and 15c, "ON" means that the opening-and-closing devices are opened to allow the refrigerant to flow therethrough, and "OFF" means that the opening-and-closing devices are closed.

[Cooling Only Operation]

Figure 6:
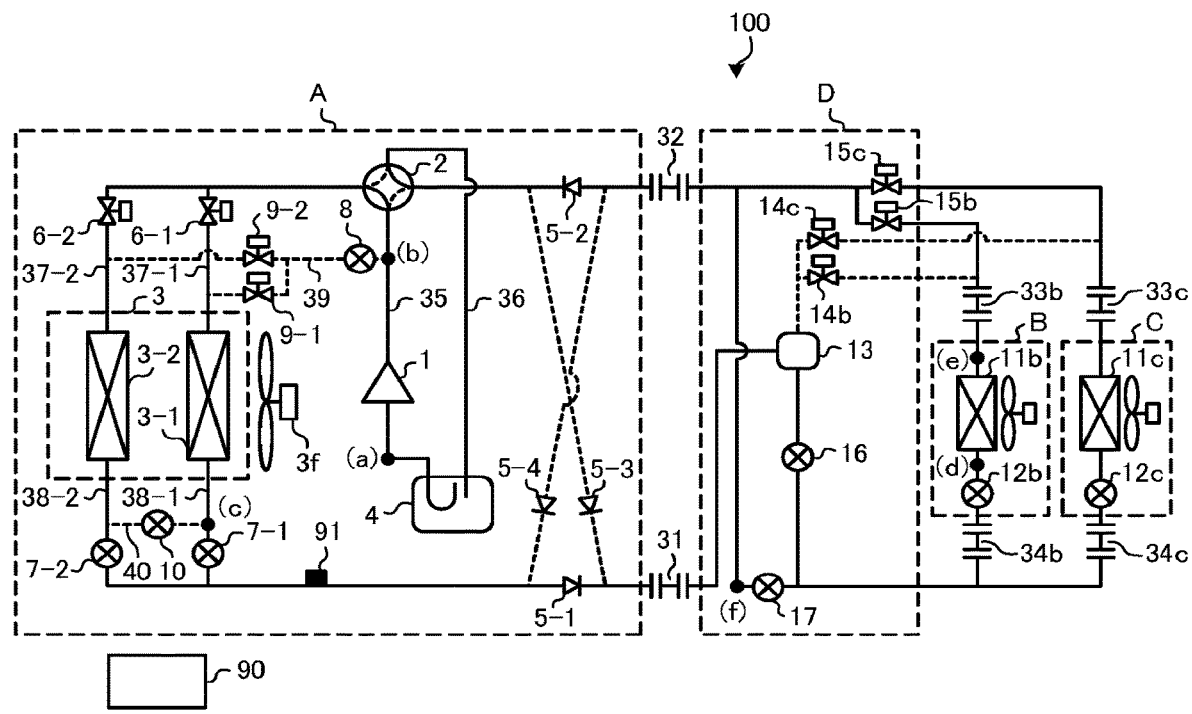
FIG. 6 illustrates the flow of refrigerant in a cooling only operation of the air-conditioning apparatus 100 according to Embodiment 1.

FIG. 6 illustrates the flow of the refrigerant in the cooling only operation of the air-conditioning apparatus 100 according to Embodiment 1. In FIG. 6, the solid lines indicate passages through which the refrigerant flows in the cooling only operation, and the broken lines indicate passages through which the refrigerant does not flow in the cooling only operation. It should be noted that FIG. 6 illustrates the case in which the indoor units B and C perform cooling.

Figure 7:
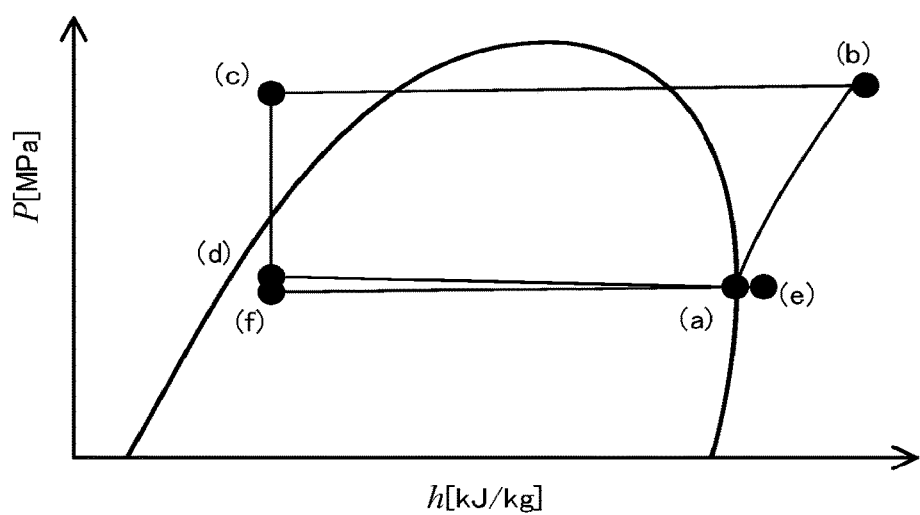
FIG. 7 is a P-h diagram of the air-conditioning apparatus 100 according to Embodiment 1 in the cooling only operation.

FIG. 7 is a P-h diagram of the air-conditioning apparatus 100 according to Embodiment 1 in the cooling only operation. In FIG. 7, points (a) to (f) denote the states of the refrigerant at points denoted by the same signs in FIG. 6.

When the operation of the compressor 1 is started, in the outdoor unit A, the compressor 1 compresses low-temperature low-pressure gas refrigerant into high-temperature high-pressure gas, and then discharges the high-temperature high-pressure gas refrigerant. In this refrigerant compression process of the compressor 1, the refrigerant is compressed in such a way as to be more greatly heated by an amount corresponding to the adiabatic efficiency of the compressor 1 than in an isentropic adiabatic compression, and the refrigerant compression process is indicated by a line extending from point (a) to point (b) in FIG. 7.

The high-temperature high-pressure gas refrigerant discharged from the compressor 1 passes through the flow switching device 2, and is branched into two refrigerants. One of the two refrigerants passes through the first opening-and-closing device 6-1 and the first connection pipe 37-1, and flows into the parallel heat exchanger 3-1, and the other passes through the first opening-and-closing device 6-2 and the first connection pipe 37-2, and flows into the parallel heat exchanger 3-2.

In each of the parallel heat exchangers 3-1 and 3-2, the refrigerant is cooled while heating outdoor air, whereby it becomes intermediate-temperature high-pressure liquid refrigerant. In consideration of pressure loss, the change of the refrigerant in the parallel heat exchangers 3-1 and 3-2 is indicated by a slightly inclined and nearly horizontal straight line extending from point (b) to point (c) in FIG. 7.

The intermediate-temperature high-pressure liquid refrigerant is discharged from the parallel heat exchangers 3-1 and 3-2. Then, the refrigerant discharged from the parallel heat exchanger 3-1 and that discharged from the parallel heat exchangers 3-2 enter the second connection pipes 38-1 and 38-2, pass through the flow-rate control devices 7-1 and 7-2, which are fully opened, and then join to each other to become single refrigerant. The refrigerant passes through the backflow preventing device 5-1 and the first extension pipe 31, and flows into the relay device D.

It should be noted that for example, in the case where the operation loads of the indoor units B and C are small, one of the first opening-and-closing devices 6-1 and 6-2 may be closed to stop flowing of the refrigerant into an associated one of the parallel heat exchangers 3-1 and 3-2. In this case, the heat transfer area of the outdoor heat exchanger 3 is reduced as a result, and a cycle operation can be stably performed.

The refrigerant which has flown into the relay device D flows into the gas-liquid separation device 13. It should be noted that the gas-liquid separation device 13 is provided to separate refrigerant flowing thereinto into gas refrigerant and liquid refrigerant. However, since the refrigerant having flown into the gas-liquid separation device 13 is liquid refrigerant, and the first relay opening-and-closing devices 14b and 14c are closed, the refrigerant having flown into the gas-liquid separation device 13 entirely flows out of the liquid phase portion.

After flowing out of the gas-liquid separation device 13, the liquid refrigerant passes through the first relay flow-rate control device 16, which is fully opened, and is branched into two refrigerants. One of the two refrigerants passes through the fourth extension pipes 34b and 34c, and flows into the indoor units B and C which is performing cooling. The other refrigerant flows into the second relay flow-rate control device 17. In the second relay flow-rate control device 17, the refrigerant is expanded and reduced in pressure to change into low-temperature low-pressure refrigerant which is in a two-phase gas-liquid state. The change of the refrigerant in the second relay flow-rate control device 17 is isenthalpic, and is indicated by a vertical line extending from point (c) to point (f) in FIG. 7.

The liquid refrigerant which has entered the indoor units B and C flows into the indoor flow-rate control devices 12b and 12c, in which the refrigerant is expanded and reduced in pressure, thereby being converted into low-temperature low-pressure refrigerant in a two-phase gas-liquid state. The change of the refrigerant in the indoor flow-rate control devices 12b and 12c is isenthalpic, and is indicated by a vertical line extending from point (c) to point (d) in FIG. 7.

After flowing out of the indoor flow-rate control devices 12b and 12c, the low-temperature low-pressure refrigerant being in the two-phase gas-liquid state flows into the indoor heat exchangers 11b and 11c, which function as evaporators. In the indoor heat exchangers 11b and 11c, the refrigerant is heated while cooling indoor air, whereby it becomes low-temperature low-pressure gas refrigerant. It should be noted that the indoor flow-rate control devices 12b and 12c are controlled such that the degree of superheat of the low-temperature low-pressure gas refrigerant which flows out of the indoor heat exchangers 11b and 11c falls within the range of approximately 2 to 5 K. In consideration of pressure loss, the change of the refrigerant in the indoor heat exchangers 11*b* and 11*c* is indicated by a slightly inclined and nearly horizontal straight line extending from point (d) to point (e) in FIG. 7.

After flowing from the indoor heat exchangers 11*b* and 11*c*, the low-temperature low-pressure gas refrigerant passes through the third extension pipes 33*b* and 33*c* and re-flows into the relay device D.

The low-temperature low-pressure gas refrigerant which have re-flown into the relay device D passes through the second relay opening-and-closing devices 15*b* and 15*c*, and then joins the low-temperature low-pressure refrigerant being in the two-phase gas-liquid state which has passed through the second relay flow-rate control device 17. The resultant refrigerant obtained by the above joining passes through the second extension pipe 32 and flows into the outdoor unit A. Normally, the flow rate of the low-temperature low-pressure gas refrigerant which has passed through the indoor units B and C is higher than that of the low-temperature low-pressure refrigerant being in the two-phase gas-liquid state which has passed through the second relay flow-rate control device 17. The above resultant refrigerant obtained by the joining which flows into the outdoor unit A becomes low-temperature low-pressure gas refrigerant the superheat of which is small. The state of this refrigerant is indicated by point (a) in FIG. 7.

The low-temperature low-pressure gas refrigerant which has flown into the outdoor unit A passes through the backflow preventing device 5-2, the flow switching device 2 and the accumulator 4, and flows into the compressor 1. In the compressor 1, the refrigerant is compressed.

[Cooling Main Operation]

Figure 8:
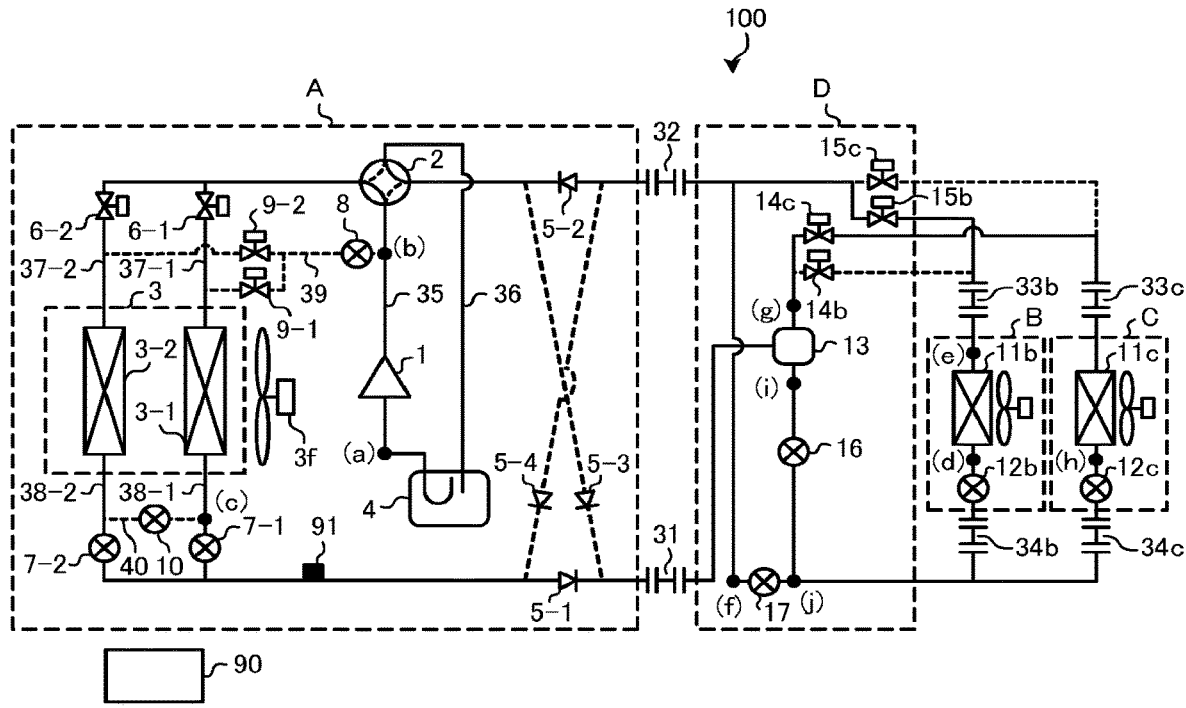
FIG. 8 illustrates the flow of refrigerant in a cooling main operation of the air-conditioning apparatus 100 according to Embodiment 1.

FIG. 8 illustrates the flow of the refrigerant in the cooling main operation of the air-conditioning apparatus 100 according to Embodiment 1. In FIG. 8, the solid lines indicate passages through which the refrigerant flows in the cooling main operation, and the broken lines indicate passages through which the refrigerant does not flow in the cooling main operation. FIG. 8 illustrates the case in which the indoor unit B performs cooling, and the indoor unit C performs heating. Also, Embodiments 2 and 3 will be described later by also referring to the case where the indoor unit B performs cooling, and the indoor unit C performs heating. In the case where the indoor unit B performs heating and the indoor unit C performs cooling, the opened/closed states of the indoor flow-rate control devices 12*b* and 12*c*, the first relay opening-and-closing devices 14*b* and 14*c* and the second relay opening-and-closing devices 15*b* and 15*c* are opposite to those of the above case where the indoor unit B performs cooling, and the indoor unit C performs heating, and the flow of the refrigerant in the indoor unit B and that in the indoor unit C are reversed, and also opposite to those of the above case, and the other operations are the same as those in the above case.

Figure 9:
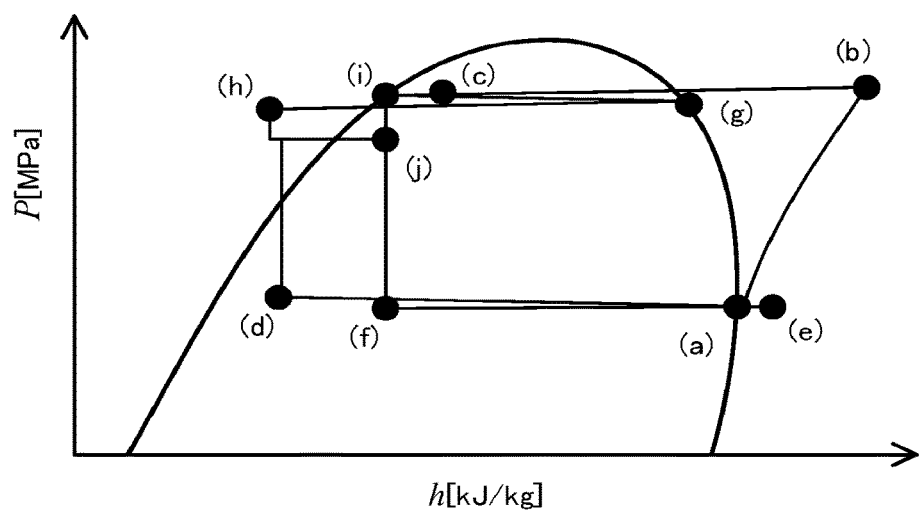
FIG. 9 is a P-h diagram of the air-conditioning apparatus 100 according to Embodiment 1 in the cooling main operation.

FIG. 9 is a P-h diagram of the air-conditioning apparatus 100 according to Embodiment 1 in the cooling main operation. In FIG. 9, points (a) to (j) denote the states of the refrigerant at points indicated by the same signs in FIG. 8.

When the operation of the compressor 1 is started, in the outdoor unit A, the compressor 1 compresses low-temperature low-pressure gas refrigerant into high-temperature high-pressure gas refrigerant, and discharges the high-temperature high-pressure gas refrigerant. In this refrigerant compression process of the compressor 1, the refrigerant is compressed in such a way as to be more greatly heated by an amount corresponding to the adiabatic efficiency of the compressor 1 than in an isentropic adiabatic compression, and the refrigerant compression process is indicated by a line extending from point (a) to point (b) in FIG. 9.

The high-temperature high-pressure gas refrigerant discharged from the compressor 1 passes through the flow switching device 2 and is branched into two refrigerants. One of the two refrigerants passes through the first opening-and-closing device 6-1 and the first connection pipe 37-1, and flows into the parallel heat exchanger 3-1. The other refrigerant passes through the first opening-and-closing device 6-2 and the first connection pipe 37-2, and flows into the parallel heat exchanger 3-2.

The refrigerant which has flowed into the parallel heat exchangers 3-1 and 3-2 is cooled while heating outdoor air, whereby it becomes intermediate-temperature high-pressure refrigerant in a two-phase gas-liquid state. In consideration of pressure loss, the change of the refrigerant in the parallel heat exchangers 3-1 and 3-2 is indicated by a slightly inclined and nearly horizontal straight line extending from points (b) to (c) in FIG. 9.

The intermediate-temperature high-pressure refrigerant being in the two-phase gas-liquid state which has flown from the parallel heat exchangers 3-1 and 3-2 flows into the second connection pipes 38-1 and 38-2, passes through the flow-rate control devices 7-1 and 7-2, which are fully opened, and then join together. The resultant obtained by the above joining flows passes through the backflow preventing device 5-1 and the first extension pipe 31, and flows into the relay device D.

It should be noted that for example, in the case where the operation loads of the indoor units B and C are small or the ratio of the heating load to the cooling load is high, one of the first opening-and-closing devices 6-1 and 6-2 may be closed to stop flowing of the refrigerant into an associated one of the parallel heat exchangers 3-1 and 3-2. In this case, the heat transfer area of the outdoor heat exchanger 3 is reduced as a result, and a cycle operation can be stably performed.

The refrigerant which has flown into the relay device D flows into the gas-liquid separation device 13. The gas-liquid separation device 13 separates the refrigerant into gas refrigerant and liquid refrigerant. The gas refrigerant flows out from the gas phase portion, and flows into the first relay opening-and-closing device 14*c*. The liquid refrigerant flows out from the liquid phase portion, and flows into the first relay flow-rate control device 16. The change of the refrigerant in the gas-liquid separation device 13 is made, with the pressure kept constant, and the refrigerant is separated into saturated gas and saturated liquid. The gas refrigerant which flows out from the gas phase portion is indicated by a horizontal line extending from point (c) to point (g) in FIG. 9, and the liquid refrigerant which flows out from the liquid phase portion is indicated by a horizontal line extending from point (c) to point (i) in FIG. 9.

The gas refrigerant which has flowed into the first relay opening-and-closing device 14*c* passes through the third extension pipe 33*c*, and flows into the indoor unit C performing heating.

The gas refrigerant which has flown into the indoor unit C flows into the indoor heat exchanger 11*c* functioning as a condenser, and is cooled while heating indoor air, whereby it changes into intermediate-temperature high-pressure liquid refrigerant. In consideration of pressure loss, the change of the refrigerant in the indoor heat exchanger 11*c* is indicated by a slightly inclined and nearly horizontal straight line extending from point (g) to point (h) in FIG. 9. After flowing out of the indoor heat exchanger 11*c*, the intermediate-temperature high-pressure liquid refrigerant flows into the indoor flow-rate control device 12c, and is expanded and reduced in pressure therein. Then, the refrigerant flows out of the indoor unit C, and passes through the fourth extension pipe 34c. It should be noted that the indoor flow-rate control device 12c is controlled such that the degree of subcooling of the intermediate-temperature high-pressure liquid refrigerant which flows out of the indoor heat exchanger 11c falls within the range of approximately 5 to 20 K.

The liquid refrigerant which has flowed into the first relay flow-rate control device 16 is expanded and reduced in pressure. The change in the refrigerant in the first relay flow-rate control device 16 is isenthalpic, and is indicated by a vertical line extending from point (i) to point (j) in FIG. 9.

The refrigerant which has flowed out of the first relay flow-rate control device 16 is branched into two refrigerants. One of the two refrigerant joins the refrigerant which has flowed out of the indoor unit C, and which has passed through the fourth extension pipe 34c, then flows through the fourth extension pipe 34b and flows into the indoor unit B performing cooling. The other refrigerant flows into the second relay flow-rate control device 17, and is expanded and reduced in pressure therein, whereby it changes into low-temperature low-pressure refrigerant which is in a two-phase gas-liquid state. This change of the refrigerant in the second relay flow-rate control device 17 is isenthalpic, and is indicated by a vertical line extending from point (j) to point (f) in FIG. 9.

The resultant refrigerant obtained by the above joining which flows into the indoor unit B becomes liquid refrigerant or refrigerant being in a two-phase gas-liquid state in accordance with the relationship between the flow rate of the refrigerant which passes through the indoor unit C and the flow rate of the refrigerant which passes through the first relay flow-rate control device 16 and the heating load of the indoor unit C.

The liquid refrigerant or the refrigerant being in the two-phase gas-liquid state which has flowed into the indoor unit B flows into the indoor flow-rate control device 12b, and is expanded and reduced in pressure therein, whereby the refrigerant changes into low-temperature low-pressure refrigerant being in a two-phase gas-liquid state. This change of the refrigerant in the indoor flow-rate control device 12b is isenthalpic, and the state of the refrigerant which flows out of the indoor flow-rate control device 12b is denoted by point (d) in FIG. 9.

The low-temperature low-pressure refrigerant being in the two-phase gas-liquid state which has flowed out of the indoor flow-rate control device 12b flows into the indoor heat exchanger 11b functioning as an evaporator.

The refrigerant which has flowed into the indoor heat exchanger 11b is heated while cooling indoor air, whereby it changes into low-temperature low-pressure gas refrigerant. The indoor flow-rate control device 12b is controlled such that the degree of superheat of the low-temperature low-pressure gas refrigerant which flows out of the indoor heat exchanger 11b falls within the range of 2 to 5 K. In consideration of pressure loss, the change of the refrigerant in the indoor heat exchanger 11b is indicated by a line slightly inclined and nearly horizontal straight line extending from point (d) to point (e) in FIG. 9. The low-temperature low-pressure gas refrigerant which has flown out of the indoor heat exchanger 11b passes through the third extension pipe 33b, and re-flows into the relay device D.

The low-temperature low-pressure gas refrigerant which has re-flown into the relay device D passes through the second relay opening-and-closing device 15b, and then joins the low-temperature low-pressure two-phase refrigerant which has passed through the second relay flow-rate control device 17. The resultant refrigerant obtained by the above joining passes through the second extension pipe 32, and flows into the outdoor unit A. Normally, the flow rate of the low-temperature low-pressure gas refrigerant which has passed through the indoor units B and C is higher than that of the low-temperature low-pressure two-phase refrigerant which has passed through the second relay flow-rate control device 17. The above resultant refrigerant having flown into the outdoor unit A becomes low-temperature low-pressure gas refrigerant whose degree of superheat is small, and the state of this refrigerant is indicated by point (a) in FIG. 9.

The low-temperature low-pressure gas refrigerant which has flown into the outdoor unit A passes through the backflow preventing device 5-2, the flow switching device 2 and the accumulator 4, and then flows into the compressor 1, and is compressed therein.

[Normal heating only operation]

Figure 10:
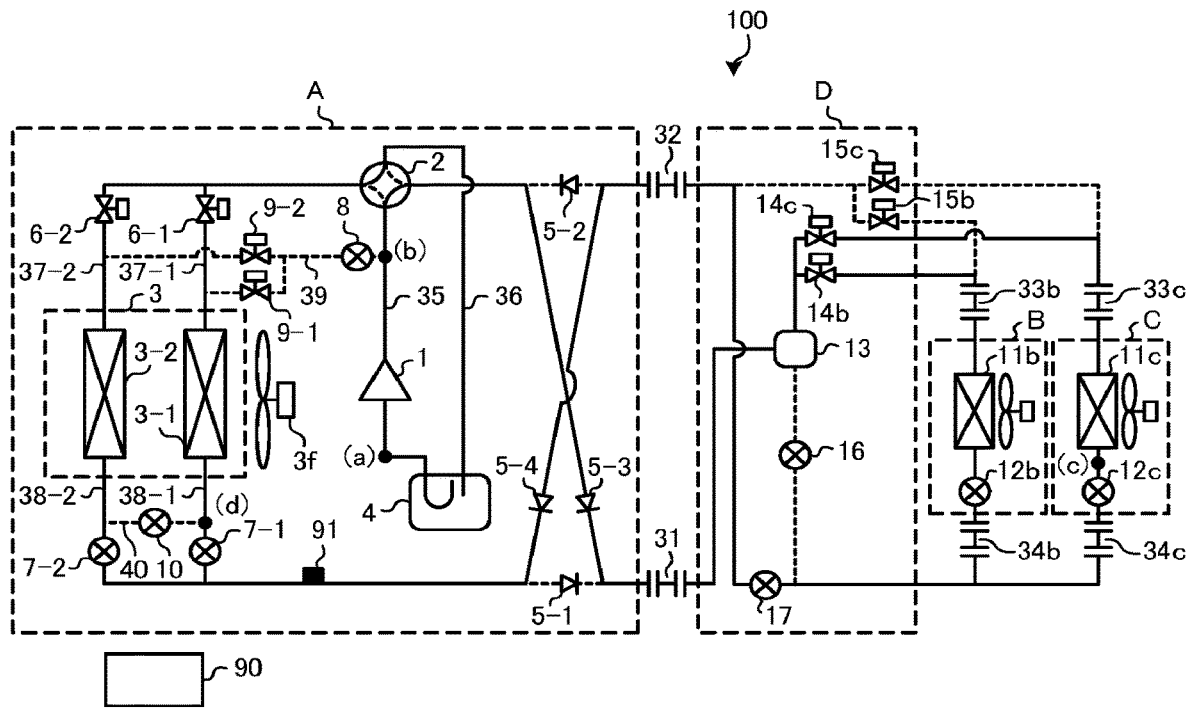
FIG. 10 illustrates the flow of refrigerant in a normal heating only operation of the air-conditioning apparatus 100 according to Embodiment 1.

FIG. 10 illustrates the flow of the refrigerant in the normal heating only operation of the air-conditioning apparatus 100 according to Embodiment 1. In FIG. 10, the solid lines indicate passages through which the refrigerant flows in the normal heating only operation, and the broken lines indicate passages through which the refrigerant does not flow in the normal heating only operation. FIG. 10 illustrates the case in which the indoor units B and C perform heating.

Figure 11:
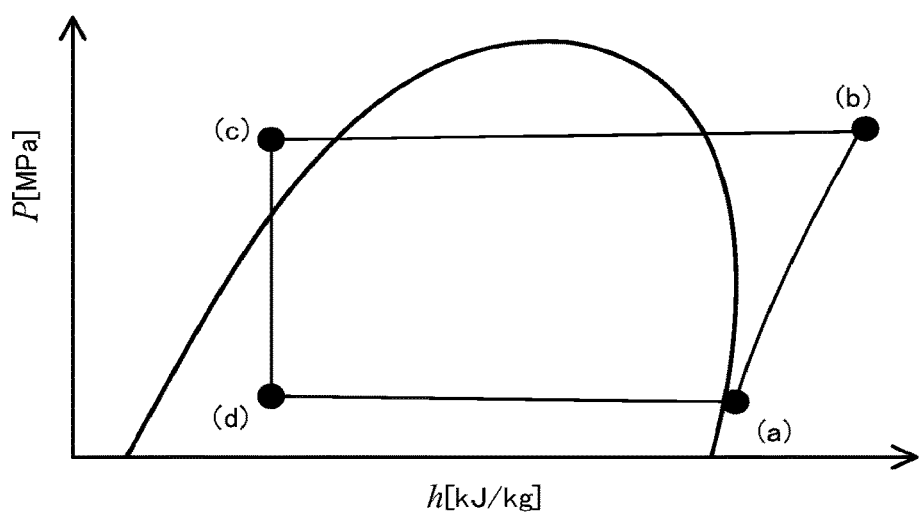
FIG. 11 is a P-h diagram of the air-conditioning apparatus 100 according to Embodiment 1 in the normal heating only operation.

FIG. 11 is a P-h diagram of the air-conditioning apparatus 100 according to Embodiment 1 in the normal heating only operation. In FIG. 11, points (a) to (d) indicate the states of the refrigerant at points denoted by the same signs as in FIG. 10.

When the operation of the compressor 1 is started, in the outdoor unit A, the compressor 1 compresses low-temperature low-pressure gas refrigerant into high-temperature high-pressure gas refrigerant, and discharges the high-temperature high-pressure gas refrigerant. In this refrigerant compression process performed by the compressor 1, the refrigerant is compressed in such a way as to be more greatly heated by an amount corresponding to the adiabatic efficiency of the compressor 1 than in an isentropic adiabatic compression, and the refrigerant compression process is indicated by a line extending from point (a) to point (b) in FIG. 11.

The high-temperature high-pressure gas refrigerant discharged from the compressor 1 passes through the flow switching device 2, and then through the backflow preventing device 5-3, and flows out of the outdoor unit A. The high-temperature high-pressure gas refrigerant which has flowed out of the outdoor unit A passes through the first extension pipe 31, and flows into the relay device D.

The refrigerant which has flown into the relay device D flows into the gas-liquid separation device 13. Although the gas-liquid separation device 13 is provided to separate refrigerant into gas refrigerant and liquid refrigerant, since the refrigerant having flown into the gas-liquid separation device 13 is gas refrigerant, and the first relay flow-rate control device 16 is closed, the refrigerant having flown into the gas-liquid separation device 13 flows out from the gas phase portion. The gas refrigerant which has flowed out of the gas-liquid separation device 13 passes through the first relay opening-and-closing devices 14b and 14c, and then through the third extension pipes 33b and 33c, and flows into the indoor units B and C performing heating.

The refrigerant which has flown into the indoor units B and C flows into the indoor heat exchangers 11b and 11c functioning as condensers, and is cooled while heating indoor air, whereby it changes into intermediate-temperature high-pressure liquid refrigerant. In consideration of pressure loss, the change of the refrigerant in the indoor heat exchangers 11b and 11c is indicated by a slightly inclined and nearly horizontal straight line extending from point (b) to point (c) in FIG. 11.

The intermediate-temperature high-pressure liquid refrigerant which has flowed out of the indoor heat exchangers 11b and 11c flows into the indoor flow-rate control devices 12b and 12c, and is expanded and reduced in pressure therein. The change of the refrigerant in the indoor flow-rate control devices 12b and 12c is isenthalpic. It should be noted that the indoor flow-rate control devices 12b and 12c are controlled such that the degree of subcooling of the intermediate-temperature high-pressure liquid refrigerant falls within the range of 5 to 20 K.

The refrigerant which has flowed out of the indoor flow-rate control devices 12b and 12c passes through the fourth extension pipes 34b and 34c, and re-flows into the relay device D.

The refrigerant which has re-flown into the relay device D passes through the second relay flow-rate control device 17, which is fully opened, and then passes through the second extension pipe 32, and flows into the outdoor unit A.

The refrigerant which has flown into the outdoor unit A passes through the backflow preventing device 5-4 and flows into the second connection pipes 38-1 and 38-2. The refrigerant which has flowed into the second connection pipes 38-1 and 38-2 is expanded and reduced in pressure by the flow-rate control devices 7-1 and 7-2, whereby it changes low-pressure refrigerant being in a two-phase gas-liquid state. The change of the refrigerant in the flow-rate control devices 7-1 and 7-2 is isenthalpic. Since the change of the refrigerant which is made until the refrigerant flows from the indoor heat exchangers 11b and 11c and through the flow-rate control devices 7-1 and 7-2 is isenthalpic, the change of the refrigerant is indicated by a line extending from point (c) to point (d) in FIG. 11.

The flow-rate control devices 7-1 and 7-2 may be set such that the opening degrees thereof are constant, for example, they are kept in a fully opened state, or be controlled such that the saturation temperature at an intermediate pressure at, for example, the second extension pipe 32 detected by the refrigerant pressure sensor 91 reaches approximately 0 to 20 degrees C. By controlling the saturation temperature at the intermediate pressure in, for example, the second extension pipe 32, dew condensation on the pipe surface or freezing of the pipe surface can be prevented.

The refrigerant which has flowed out of the flow-rate control devices 7-1 and 7-2 flows into the parallel heat exchangers 3-1 and 3-2, and is heated while cooling outdoor air, whereby it changes into low-temperature low-pressure gas refrigerant. In consideration of pressure loss, the change of the refrigerant in the parallel heat exchangers 3-1 and 3-2 is indicated by a slightly inclined and nearly horizontal straight line extending from point (d) to point (a) in FIG. 11

The low-temperature low-pressure gas refrigerant which has flown from the parallel heat exchangers 3-1 and 3-2 flows into the first connection pipes 37-1 and 37-2, passes through the first opening-and-closing devices 6-1 and 6-2, and then joins each other. The resultant refrigerant obtained by this joining passes through the flow switching device 2 and the accumulator 4, and then flows into the compressor 1, and is compressed.

[Normal heating main operation]

Figure 12:
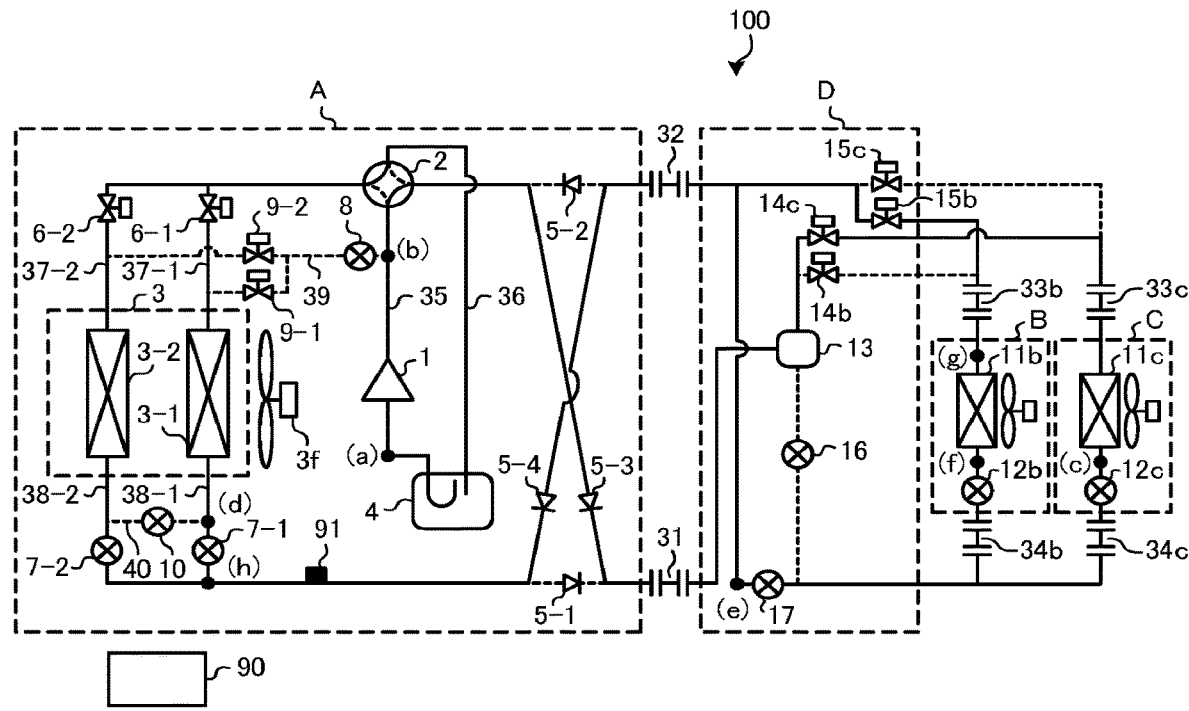
FIG. 12 illustrates the flow of refrigerant in a normal heating main operation of the air-conditioning apparatus 100 according to Embodiment 1.

FIG. 12 illustrates the flow of the refrigerant in the normal heating main operation in the air-conditioning apparatus 100 according to Embodiment 1. In FIG. 12, the solid lines indicate passages through which the refrigerant flows in the normal heating main operation, and the broken lines indicate passages through which the refrigerant does not flow in the normal heating main operation. FIG. 12 illustrates the case where the indoor unit B performs cooling, and the indoor unit C performs heating. In the case where the indoor unit B performs heating and the indoor unit C performs cooling, the opened/closed states of the indoor flow-rate control devices 12b and 12c, the first relay opening-and-closing devices 14b and 14c and the second relay opening-and-closing devices 15b and 15c are opposite to the above case where the indoor unit B performs cooling, and the indoor unit C performs heating, and the flow of the refrigerant in the indoor unit B and that in the indoor unit C are reversed, and also opposite to those in the above case. The other operations are the same as those in the above case.

Figure 13:
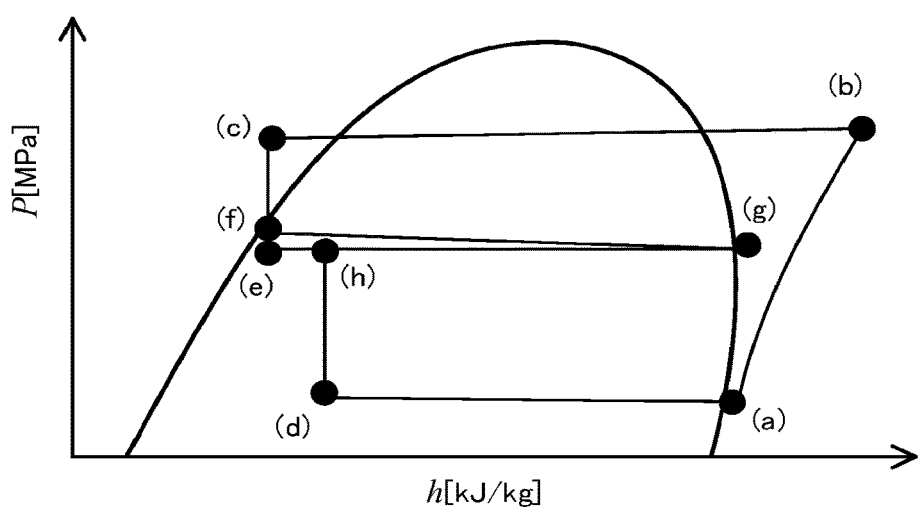
FIG. 13 is a P-h diagram of the air-conditioning apparatus 100 according to Embodiment 1 in the normal heating main operation.

FIG. 13 is a P-h diagram of the air-conditioning apparatus 100 according to Embodiment 1 in the normal heating main operation. In FIG. 13, points (a) to (h) indicate the states of the refrigerant at points denoted by the same signs in FIG. 12.

When the operation of the compressor 1 is started, in the outdoor unit A, the compressor 1 compresses low-temperature low-pressure gas refrigerant into the high-temperature high-pressure gas refrigerant, and discharges the high-temperature high-pressure gas refrigerant. In this refrigerant compression process performed by the compressor 1, the refrigerant is compressed in such a way as to be more greatly heated by an amount corresponding to the adiabatic efficiency of the compressor 1 than in an isentropic adiabatic compression, and the refrigerant compression process is indicated by a line extending from point (a) to point (b) in FIG. 13.

The high-temperature high-pressure gas refrigerant discharged from the compressor 1 passes through the flow switching device 2 and the backflow preventing device 5-3, and flows out of the outdoor unit A. The high-temperature high-pressure gas refrigerant which has flowed out of the outdoor unit A passes through the first extension pipe 31 and flows into the relay device D.

The refrigerant which has flown into the relay device D flows into the gas-liquid separation device 13. Although the gas-liquid separation device 13 is provided to receive refrigerant and separate the refrigerant into gas refrigerant and liquid refrigerant, since the refrigerant having flown into the gas-liquid separation device 13 is gas refrigerant, and the first relay flow-rate control device 16 is closed, the refrigerant having flown into the gas-liquid separation device 13 entirely flows out from the gas phase portion.

The gas refrigerant which has flowed out of the gas-liquid separation device 13 passes through the first relay opening-and-closing device 14c and the third extension pipe 33c, and flows into the indoor unit C performing heating.

The refrigerant which has flown into the indoor unit C flows into the indoor heat exchanger 11c functioning as a condenser, and is cooled while heating indoor air, whereby it changes into intermediate-temperature high-pressure liquid refrigerant. In consideration of pressure loss, the change of the refrigerant in the indoor heat exchanger 11c is indicated by a slightly inclined and nearly horizontal straight line extending from point (b) to point (c) in FIG. 13.

The intermediate-temperature high-pressure liquid refrigerant which has flowed out of the indoor heat exchanger 11c flows into the indoor flow-rate control device 12c, and is expanded and reduced in pressure. The change of the refrigerant in the indoor flow-rate control device 12c is isenthalpic. The indoor flow-rate control device 12c is controlled such that the degree of subcooling of the intermediate-temperature high-pressure liquid refrigerant falls within the range of approximately 5 to 20 K.

The refrigerant which flows out of the indoor flow-rate control device 12c passes through the fourth extension pipe 34c and is branched into two refrigerants. One of the two refrigerants re-flows into the relay device D, and the other passes through the fourth extension pipe 34b and flows into the indoor unit B.

The refrigerant which has flown into the relay device D re-passes through the second relay flow-rate control device 17, and the pressure of the refrigerant is reduced to an intermediate pressure. Then, the refrigerant passes through the second extension pipe 32 and flows into the outdoor unit A. The change of the refrigerant in the second relay flow-rate control device 17 is isenthalpic. Since the change of the refrigerant which is made until the refrigerant flows from the indoor heat exchanger 11c and has passed through the second relay flow-rate control device 17 is isenthalpic, the change of the refrigerant is indicated by a line extending from point (c) to point (e) in FIG. 13. The second relay flow-rate control device 17 is controlled to adjust the flow rate of the refrigerant which passes therethrough and the difference between the pressure of the refrigerant before passage of the refrigerant through the second relay flow-rate control device 17 and that after passage of the refrigerant through the second relay flow-rate control device 17.

The refrigerant which has flown into the indoor unit B flows into the indoor flow-rate control device 12b, and is expanded and reduced in pressure, whereby it changes into intermediate-temperature intermediate-pressure refrigerant which is in a two-phase gas-liquid state. The change of the refrigerant in the indoor flow-rate control device 12b is isenthalpic. Since the change of the refrigerant which is made until the refrigerant flows from the indoor heat exchanger 11c and has passed through the indoor flow-rate control device 12b is isenthalpic, the change of the refrigerant is indicated by a line extending from point (c) to point (f) in FIG. 13.

The intermediate-temperature intermediate-pressure refrigerant being in a two-phase gas-liquid state which has flowed out of the indoor flow-rate control device 12b flows into the indoor heat exchanger 11b functioning as an evaporator. The refrigerant which has flowed into the indoor heat exchanger 11b is heated while cooling indoor air, whereby it changes into intermediate-temperature intermediate-pressure gas refrigerant. The indoor flow-rate control device 12b is controlled such that the degree of superheat of the intermediate-temperature intermediate-pressure gas refrigerant which flows out of the indoor heat exchanger 11b falls within the range of approximately 2 to 5 K. In consideration of pressure loss, the change of the refrigerant in the indoor heat exchanger 11b is indicated by a slightly inclined and nearly horizontal straight line extending from point (f) to point (g) in FIG. 13.

The intermediate-temperature intermediate-pressure gas refrigerant which has flowed out of the indoor heat exchanger 11b passes through the third extension pipe 33b, and re-flows into the relay device D.

The intermediate-temperature intermediate-pressure gas refrigerant which has passed through the indoor unit B and flown into the relay device D passes through the second relay opening-and-closing device 15b, and joins the refrigerant which has passed through the second relay flow-rate control device 17. The resultant refrigerant obtained by the above joining passes through the second extension pipe 32, and flows into the outdoor unit A. The resultant refrigerant which has obtained by the above joining and flown into the outdoor unit A becomes intermediate-temperature intermediate-pressure liquid refrigerant or two-phase gas-liquid refrigerant in accordance with the operation loads of the indoor units B and C, and the state thereof is indicated by point (h) in FIG. 13.

The refrigerant which has flown into the outdoor unit A passes through the backflow preventing device 5-4 and flows into the second connection pipes 38-1 and 38-2. The refrigerant which has flowed into the second connection pipes 38-1 and 38-2 is expanded and reduced in pressure by the flow-rate control devices 7-1 and 7-2, whereby it changes into low-pressure refrigerant which is in a two-phase gas-liquid state. The change of the refrigerant in the flow-rate control devices 7-1 and 7-2 is isenthalpic, and is indicated by a line extending from point (h) to point (d) in FIG. 13.

The pressure detected by the refrigerant pressure sensor 91 is the pressure of the refrigerant in the indoor heat exchanger 11b functioning as an evaporator. A saturation temperature obtained by converting the detected pressure corresponds to the temperature of the refrigerant in the indoor heat exchanger 11b. The flow-rate control devices 7-1 and 7-2 are controlled to cause the temperature of the refrigerant in the indoor heat exchanger 11b functioning as an evaporator to reach a target temperature which corresponds to, for example, a set temperature of the indoor unit B performing cooling. More specifically, the flow-rate control devices 7-1 and 7-2 are controlled to cause the pressure detected by the refrigerant pressure sensor 91 to reach a target pressure which corresponds to, for example, the set temperature of the indoor unit B performing cooling.

The saturation temperature of the refrigerant in the indoor heat exchanger 11b performing cooling can be adjusted by controlling the pressure of the indoor heat exchanger 11b. Accordingly, the temperature of the air cooled by exchanging heat with the refrigerant in the indoor heat exchanger 11b can be adjusted. Thus, by controlling the pressure of the indoor heat exchanger 11b, the indoor unit B performing cooling can be operated in accordance with the set temperature for the indoor space and cooling load, and the comfortability of the indoor space can be improved.

The target pressure of the refrigerant in the indoor heat exchanger 11b is set such that a saturation temperature obtained by converting it is higher than or equal to 0 degrees C. and lower than or equal to the set temperature. When the temperature of the refrigerant in the indoor heat exchanger 11b is higher than or equal to 0 degrees C., frosting and freezing of the indoor heat exchanger 11b functioning as an evaporator can be prevented. When the temperature of the refrigerant in the indoor heat exchanger 11b is lower than or equal to the set temperature, the indoor temperature can be adjusted to the set temperature, and the comfortability of the indoor space can be improved.

The refrigerant which has flowed out of the flow-rate control devices 7-1 and 7-2 flows into the parallel heat exchangers 3-1 and 3-2, and is heated while cooling outdoor air, whereby it changes into low-temperature low-pressure gas refrigerant. In consideration of pressure loss, the change of the refrigerant in the parallel heat exchangers 3-1 and 3-2 is indicated by a slightly inclined and nearly horizontal straight line extending from point (d) to point (a) in FIG. 13.

The low-temperature low-pressure gas refrigerant which has flown from the parallel heat exchangers 3-1 and 3-2 flows into the first connection pipes 37-1 and 37-2, passes through the first opening-and-closing devices 6-1 and 6-2, and then joins each other. The resultant refrigerant obtained by the above joining passes through the flow switching device 2 and the accumulator 4, and then flows into the compressor 1, and is compressed.

[Heating only defrosting operation]

The heating only defrosting operation is performed when frost forms on the outdoor heat exchanger 3 during the normal heating only operation. Also, the heating only defrosting operation is performed, when an indoor unit which performs cooling in the heating main defrosting operation is stopped, and all of the indoor units which are in operation perform heating.

Whether or not formation of frost has occurs or not is determined as follows. For example, it is determined that formation of frost occurs when a saturation temperature obtained by converting the suction pressure of the compressor 1 greatly lowers with respect to a preset outside temperature. Alternatively, it is determined that formation of frost occurs when the difference between the outside temperature and the saturation temperature obtained by converting the suction pressure is greater than or equal to a preset value for a certain time period or more.

In the configuration of the air-conditioning apparatus 100 according to Embodiment 1, the heating only defrosting operation includes an operation in which the parallel heat exchanger 3-2 is defrosted and the parallel heat exchanger 3-1 functions as an evaporator to perform heating. The heating only defrosting operation also includes an operation in which the parallel heat exchanger 3-2 functions as an evaporator to continue heating and the parallel heat exchanger 3-1 is defrosted.

These operations are the same except that the opened/closed states of the first opening-and-closing devices 6-1 and 6-2, the second opening-and-closing devices 9-1 and 9-2 and the flow-rate control devices 7-1 and 7-2 are reversed, and the flow of the refrigerant in the parallel heat exchanger 3-1 and that in the parallel heat exchanger 3-2 are also reversed. Therefore, the following description is given by referring to the case in which the parallel heat exchanger 3-2 performs defrosting and the parallel heat exchanger 3-1 functions as an evaporator to continue heating. The same is true of the following Embodiments.

Figure 14:
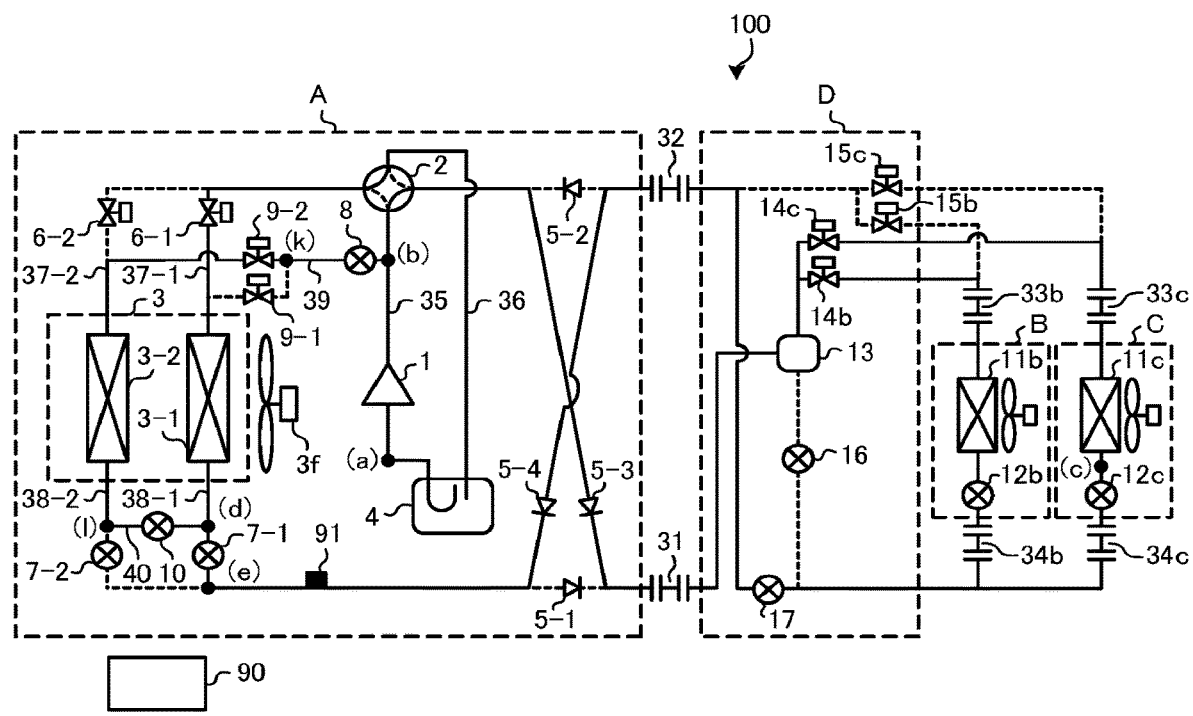
FIG. 14 illustrates the flow of refrigerant in a heating only defrosting operation for defrosting a parallel heat exchanger 3-2 of the air-conditioning apparatus 100 according to Embodiment 1.

FIG. 14 illustrates the flow of the refrigerant in the heating only defrosting operation for defrosting the parallel heat exchanger 3-2 of the air-conditioning apparatus 100 according to Embodiment 1. In FIG. 14, the solid lines show the passages through which the refrigerant flows in the heating only defrosting operation, and the broken lines show the passages through which the refrigerant does not flow in the heating only defrosting operation.

Figure 15:
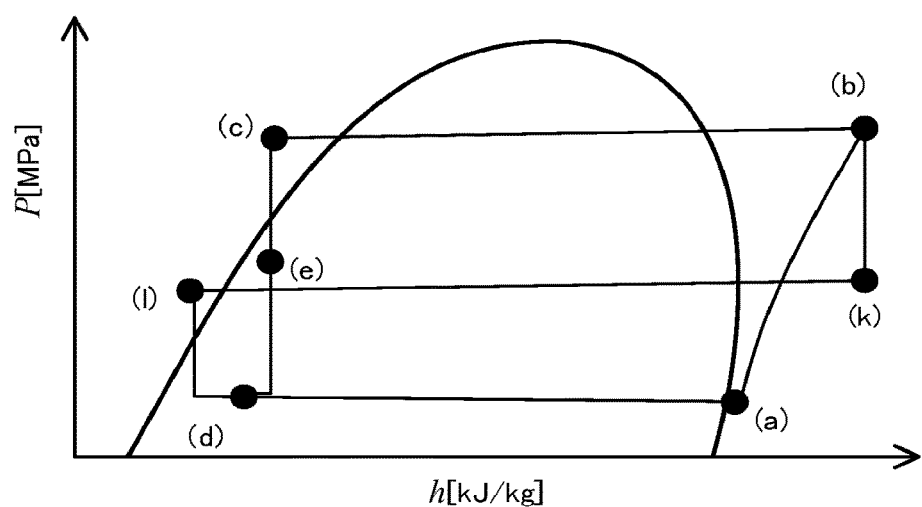
FIG. 15 is a P-h diagram of the air-conditioning apparatus 100 according to Embodiment 1 in the heating only defrosting operation.

FIG. 15 is a P-h diagram of the air-conditioning apparatus 100 according to Embodiment 1 in the heating only defrosting operation. In FIG. 15, points (a) to (e), point (k), and point (l) indicate the states of the refrigerant at points denoted by the same signs in FIG. 14.

When it is detected which defrosting needs to be performed to remove the formed frost during the normal heating only operation as illustrated in FIG. 10, the controller 90 closes the first opening-and-closing device 6-2 associated with the parallel heat exchanger 3-2 to be defrosted, and also closes the flow-rate control device 7-2. In addition, the controller 90 opens the second opening-and-closing device 9-2, and sets the opening degrees of the first expansion device 8 and the second expansion device 10 to preset initial opening degrees. The first opening-and-closing device 6-1 corresponding to the parallel heat exchanger 3-1 which functions as an evaporator is opened, and the second opening-and-closing device 9-1 is closed.

Thus, a defrosting circuit is opened, and a portion of the refrigerant discharged from the compressor 1 flows into the defrosting circuit. More specifically, the defrosting circuit in which the compressor 1, the first expansion device 8, the second opening-and-closing device 9-2, the parallel heat exchanger 3-2 and the second expansion device 10 are successively connected in this order is opened, and the heating only defrosting operation is started.

When the heating only defrosting operation is started, a portion of the high-temperature high-pressure gas refrigerant discharged from the compressor 1 flows into the first defrosting pipe 39, and the pressure thereof is reduced to an intermediate pressure by the first expansion device 8. The change of the refrigerant is represented by a line extending from point (b) to point (k) in FIG. 15.

The refrigerant whose pressure has been reduced to the intermediate pressure (point (k)) passes through the second opening-and-closing device 9-2 and flows into the parallel heat exchanger 3-2. The refrigerant which has flowed into the parallel heat exchanger 3-2 is cooled by exchanging heat with frost forming on the parallel heat exchanger 3-2.

Thus, the frost forming on the parallel heat exchanger 3-2 can be melted by causing the high-temperature high-pressure gas refrigerant discharged from the compressor 1 to flow into the parallel heat exchanger 3-2. The change of the refrigerant is indicated by a line extending from point (k) to point (l) in FIG. 15. As is seen from the change of the state of the refrigerant, the parallel heat exchanger 3-2 to be defrosted is defrosted with latent heat which does not cause a change in the temperature of the refrigerant.

Refrigerant for use in defrosting is at a saturation temperature of approximately 0 to 10 degrees C., which is higher than or equal to the temperature of the frost (0 degrees C.).

The refrigerant which has been used for defrosting and flowed out of the parallel heat exchanger 3-2 flows into the second defrosting pipe 40, and the pressure thereof is reduced to a low pressure by the second expansion device 10. Then, the refrigerant joins the main circuit, flows into the parallel heat exchanger 3-1 functioning as an evaporator, and is evaporated.

Examples of the operations of the first expansion device 8 and the second expansion device 10 during the heating only defrosting operation will be described.

During the heating only defrosting operation, the controller 90 controls the opening degree of the second expansion device 10 such that a saturation temperature obtained by converting the pressure of the refrigerant in the parallel heat exchanger 3-2 to be defrosted falls within the range of approximately 0 to 10 degrees C. The difference between the discharge pressure of the compressor 1 and the pressure of the parallel heat exchanger 3-2 to be defrosted does not greatly vary during the heating only defrosting operation. Therefore, the opening degree of the first expansion device 8 is fixed to a value in accordance with a required defrosting flow rate which is determined in advance.

In Embodiment 1, the opening degree of the second expansion device 10 is controlled such that the temperature (saturation temperature) of the refrigerant in the parallel heat exchanger 3-2 to be defrosted falls within the range of approximately 0 to 10 degrees C. If this control is not performed, the following problem arises. That is, when the temperature of the refrigerant in the parallel heat exchanger 3-2 to be defrosted is below 0 degrees C., the temperature of the refrigerant is below the temperature of the frost (0 degrees C.). Therefore, the refrigerant does not condense, and defrosting is performed only with sensible heat the heat amount of which is small. In this case, the flow rate of refrigerant to be made to flow into the parallel heat exchanger 3-2 needs to be increased to ensure a heating capacity for heating the frost. However, when the flow rate of the refrigerant to be made to flow into the parallel heat exchanger 3-2 is increased, the flow rate of refrigerant for use in heating is decreased. Therefore, the heating capacity is reduced, and the comfortability of the indoor spaces is worsened.

By contrast, when the temperature of the refrigerant in the parallel heat exchanger 3-2 to be defrosted is higher than 10 degrees C., the difference between the temperature of the refrigerant and the temperature of the frost (0 degrees C.) is great, and the refrigerant which has flown into the parallel heat exchanger 3-2 is quickly liquefied. As a result, the amount of liquid refrigerant in the parallel heat exchanger 3-2 is increased. Also in this case, the amount of refrigerant for use in heating is insufficient, as a result of which the heating capacity is reduced, and the comfortability of the indoor spaces is worsened.

In view of the above, in Embodiment 1, the opening degree of the second expansion device 10 is controlled such that the temperature of the refrigerant in the parallel heat exchanger 3-2 falls within the range of approximately 0 to 10 degrees C. Therefore, defrosting can be performed with latent heat the heat amount of which is large, and a sufficient amount of refrigerant can be applied to heating. As a result, a sufficient heating capacity can be ensured, and the comfortability of the indoor space can be improved.

The heat radiated from the refrigerant for use in defrosting is not only transferred to the frost which has formed on the parallel heat exchanger 3-2, but may be partially radiated to outdoor air. Therefore, the controller 90 may control the opening degrees of the first expansion device 8 and the second expansion device 10 such that the flow rate of the refrigerant for use in defrosting increases as the outside temperature lowers. As a result, the amount of heat applied to the frost can be kept constant regardless of the outside temperature, and the time required for defrosting can be constant.

The controller 90 may also change, for example, the threshold of the saturation temperature which is referred to to determine whether or not formation of frost occurs and time for normal operation, in accordance with the outside temperature. For example, duration time of the heating operation may be reduced as the outside temperature lowers. If the duration time of the heating operation is reduced, the amount of frost at the time when defrosting is started is reduced. Supposing that the amount of heat which is applied by the refrigerant for defrosting during defrosting is constant regardless of the outside temperature, the amount of frost which can be removed decreases as the outside temperature decreases. Therefore, in order that the frost which has formed during the heating operation be removed by applying a constant amount of heat regardless of the outside temperature, it suffices that the duration time of the heating operation is reduced as the outside temperature decreases to reduce the amount of frost at the time when defrosting is started.

In other words, by reducing the duration time of the heating operation as the outside temperature lowers, the amount of heat which is applied by the refrigerant for defrosting during defrosting can be kept constant regardless of the outside temperature. In the case where the amount of heat applied by the refrigerant for defrosting during defrosting is constant regardless of the outside temperature, the configuration of the first expansion device 8 can be simplified. More specifically, since the first expansion device 8 can be made to have a constant resistance, an inexpensive capillary tube can be used as the first expansion device 8. Also in the heating main defrosting operation which will be described below, the threshold of the saturation temperature which is referred to to determine whether or not frost has formed or the time for normal operation, for example, may be changed in accordance with the outside temperature.

In a configuration in which the parallel heat exchangers 3-1 and 3-2 are combined together and outdoor air from the outdoor fan 3f is also sent to the parallel heat exchanger to be defrosted, as in Embodiment 1, the output of the fan may be changed in accordance with the outside temperature to reduce the amount of heat radiated from the refrigerant into outdoor air. To be more specific, the output of the fan may be reduced as the outside temperature lowers. In the case where the output of the fan is reduced to reduce the amount of heat radiated into outdoor air from the parallel heat exchanger 3-2 to be defrosted, defrosting can be ended more early. Furthermore, in the case where the heating capacity for defrosting is reduced by an amount by which the amount of radiated heat is reduced, the heating capacity can be increased by the amount.

The controller 90 may set a threshold temperature for the outside temperature and perform switching between defrosting operations in accordance with the relationship between the outside temperature and the threshold temperature. To be more specific, when the outside temperature is higher than the threshold temperature, the heating only defrosting operation is performed. When the outside temperature is lower than or equal to the threshold temperature, the direction of the connection of the flow switching device 2 is changed to the same direction as in the cooling operation, such that the refrigerant flows in the same direction as in the cooling only operation; that is, a so-called reverse defrosting operation is performed. The threshold temperature is set to, for example, −5 degrees C. or −10 degrees C. In the reverse defrosting operation, "entire defrosting" is performed in which the parallel heat exchangers 3-1 and 3-2 are both defrosted. In the reverse defrosting operation, the indoor heat exchangers cannot function as condensers, and therefore heating is not performed in the indoor unit B or the indoor unit C.

When the outside temperature is lower than or equal to 0 degrees C., for example, when the outside temperature is −5 degrees C. or −10 degrees C., the absolute humidity of outside air is low from the beginning. Therefore, the amount of frost which forms is small, and the normal heating operation is performed for a long time before the amount of frost which forms reaches a certain amount. Therefore, when the outside temperature is lower than or equal to 0 degrees C., even if the reverse defrosting operation is performed and heating performed by the indoor units B and C is stopped, the time for which heating performed by the indoor units B and C is stopped is relatively short, and this does not greatly influence the comfortability. By contrast, when the outside temperature is lower than or equal to 0 degrees C., if the heating defrosting operation is performed, a large amount of heat is radiated into outside air from the outdoor heat exchanger 3 to be defrosted. As can be seen from the above, defrosting can be efficiently performed by performing the heating only defrosting operation when the outside temperature is higher than the threshold temperature, and performing the reverse defrosting operation when the outside temperature is lower than or equal to the threshold temperature.

[Heating main defrosting operation]

The heating main defrosting operation is performed when frost forms on the outdoor heat exchanger 3 during the normal heating main operation. Alternatively, the heating main defrosting operation is performed when one or more of the indoor units start to perform cooling during the heating only defrosting operation.

The determination of whether or not frost has accumulated is made in the same or similar manner as or to that in the heating only defrosting operation.

In the following description, as in the heating only defrosting operation, it is assumed that the parallel heat exchanger 3-2 performs defrosting, and the parallel heat exchanger 3-1 functions as an evaporator to continue heating. In addition, as in the normal heating main operation, it is assumed which the indoor unit B performs cooling and the indoor unit C performs heating.

Figure 16:
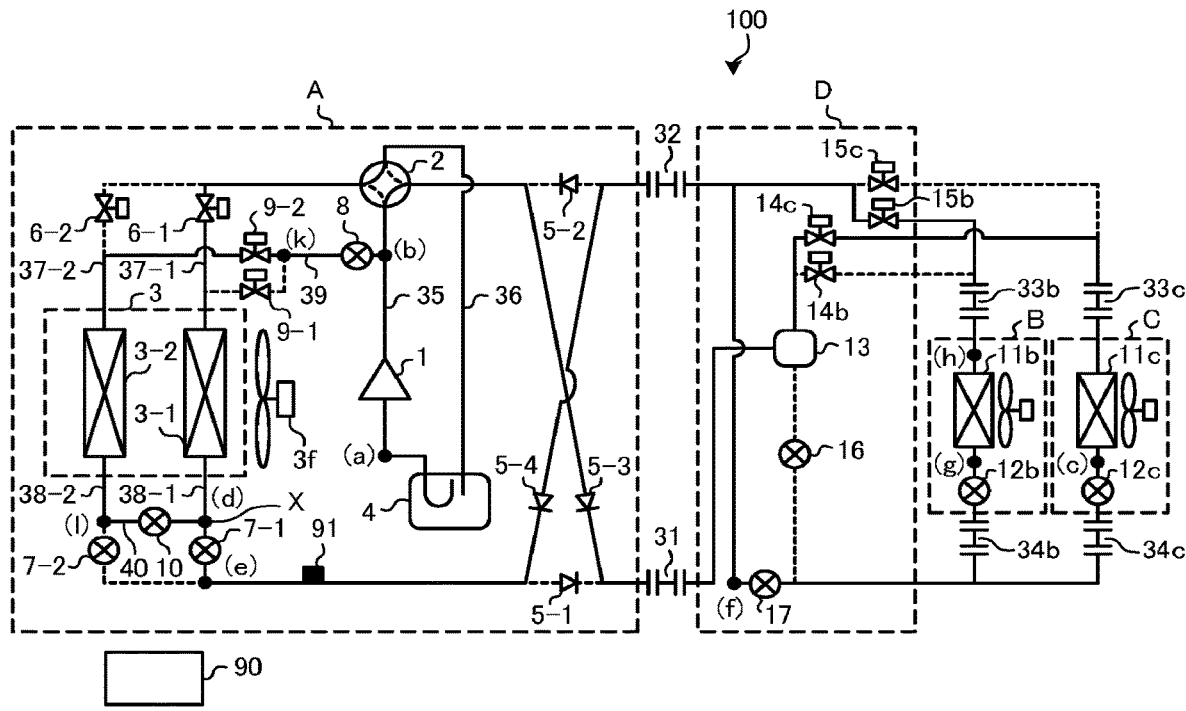
FIG. 16 illustrates the flow of the refrigerant in a heating main defrosting operation for defrosting the parallel heat exchanger 3-2 of the air-conditioning apparatus 100 according to Embodiment 1.

FIG. 16 illustrates the flow of the refrigerant in the heating main defrosting operation for defrosting the parallel heat exchanger 3-2 of the air-conditioning apparatus 100 according to Embodiment 1. In FIG. 16, the solid lines indicate passages through which the refrigerant flows in the heating main defrosting operation, and the broken lines indicate passages through which the refrigerant does not flow in the heating main defrosting operation.

Figure 17:
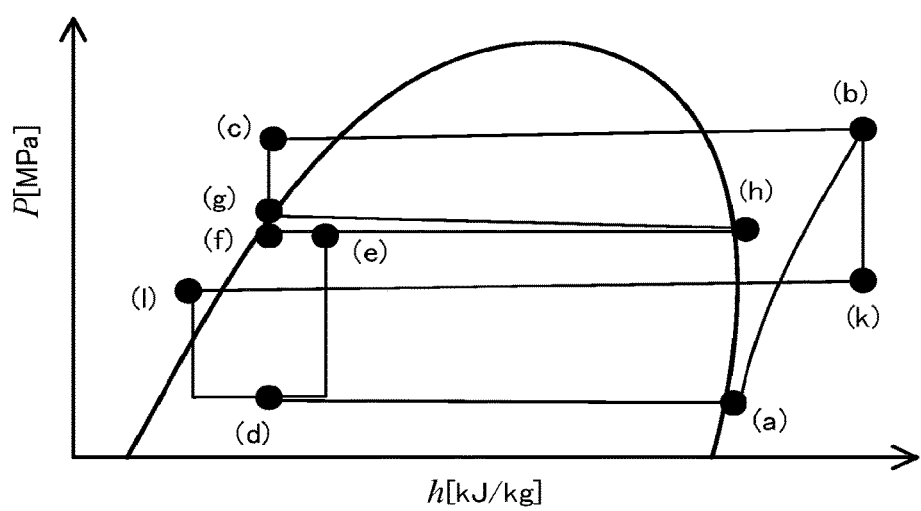
FIG. 17 is a P-h diagram of the air-conditioning apparatus 100 according to Embodiment 1 in the heating main defrosting operation.

FIG. 17 is a P-h diagram of the air-conditioning apparatus 100 according to Embodiment 1 in the heating main defrosting operation. In FIG. 17, points (a) to (h), point (k) and point (l) indicate the states of the refrigerant at points denoted by the same signs in FIG. 16.

When it is detected that defrosting needs to be performed to remove the formed frost during the normal heating main operation as illustrated in FIG. 12, the controller 90 closes the first opening-and-closing device 6-2 associated with the parallel heat exchanger 3-2 to be defrosted, and also closes the flow-rate control device 7-2. In addition, the controller 90 opens the second opening-and-closing device 9-2, and sets the opening degrees of the first expansion device 8 and the second expansion device 10 to preset initial opening degrees. The first opening-and-closing device 6-1 associated with the parallel heat exchanger 3-1 which functions as an evaporator is opened, and the second opening-and-closing device 9-1 is closed.

Thus, the defrosting circuit is opened, and a portion of the refrigerant discharged from the compressor 1 flows into the defrosting circuit. To be more specific, the defrosting circuit, in which the compressor 1, the first expansion device 8, the second opening-and-closing device 9-2, the parallel heat exchanger 3-2 and the second expansion device 10 are successively connected in this order, is opened and the heating main defrosting operation is started.

When the heating main defrosting operation is started, a portion of the high-temperature high-pressure gas refrigerant discharged from the compressor 1 flows into the first defrosting pipe 39, and the pressure thereof is reduced to an intermediate pressure by the first expansion device 8. The change of the refrigerant is indicated by a line extending from point (b) to point (k) in FIG. 17.

The refrigerant whose pressure has been reduced to the intermediate pressure (point (k)) passes through the second opening-and-closing device 9-2 and flows into the parallel heat exchanger 3-2. The refrigerant which has flowed into the parallel heat exchanger 3-2 is cooled by exchanging heat with frost which has formed on the parallel heat exchanger 3-2. The change of the refrigerant is indicated by a line extending from point (k) to point (l) in FIG. 17.

The refrigerant for defrosting is at a saturation temperature of approximately 0 to 10 degrees C., which is higher than or equal to the temperature of the frost (0 degrees C.).

The refrigerant which has been used for defrosting and flowed out of the parallel heat exchanger 3-2 flows into the second defrosting pipe 40, and the pressure thereof is reduced to a low pressure by the second expansion device 10. Then, the refrigerant enters the main circuit. The change of the refrigerant is indicated by a line extending from point (l) to point (d) in FIG. 17. The refrigerant which has entered the main circuit flows into the parallel heat exchanger 3-1 functioning as an evaporator, and is evaporated. The change of the refrigerant is indicated by a line extending from point (d) to point (a) in FIG. 17.

Examples of the operations of the first expansion device 8 and the second expansion device 10 during the heating main defrosting operation will be described.

During the heating main defrosting operation, the controller 90 controls the opening degree of the second expansion device 10 such that a saturation temperature obtained by converting the pressure of the refrigerant in the parallel heat exchanger 3-2 to be defrosted falls within the range of approximately 0 to 10 degrees C. The opening degree of the first expansion device 8 is fixed to a value corresponding to the required defrosting flow rate which is determined in advance. Alternatively, the controller 90 may control the first expansion device 8 and the second expansion device 10 such that the defrosting flow rate increases as the outside temperature lowers.

An example of the operation of the flow-rate control device 7-1 during the heating main defrosting operation will be described.

In the heating main defrosting operation, the controller 90 controls the opening degree of the flow-rate control device 7-1 such that the pressure detected by the refrigerant pressure sensor 91, that is, the pressure of the refrigerant in the indoor heat exchanger 11b functioning as an evaporator, reaches the target pressure which corresponds to, for example, the set temperature of the indoor unit B performing cooling.

The positional relationship between the flow-rate control device 7-1 and the second expansion device 10 and an advantage resulting from the positional relationship will be described. In Embodiment 1, the flow-rate control device 7-1 is provided upstream of the outlet of the second expansion device 10. In other words, the flow-rate control device 7-1 is located between a connection point X (see FIG. 16) between the outlet of the second defrosting pipe 40 and the main circuit and the indoor heat exchanger 11b which functions as an evaporator.

In the indoor unit B performing cooling, a "cooling pressure (Y)", which is the pressure of the refrigerant in the indoor heat exchanger 11b, needs to be adjusted to a target pressure which corresponds to the set temperature. However, if the flow-rate control device 7-1 is provided downstream of the outlet of the second expansion device 10, the "cooling pressure (Y)" is limited and may not be adjustable to the target pressure. In contrast, in the case where the flow-rate control device 7-1 is provided upstream of the outlet of the second expansion device 10 as in Embodiment 1, the "cooling pressure (Y)" is not limited and is adjustable to the target pressure. This will be further described with reference to FIG. 18.

Figure 18:
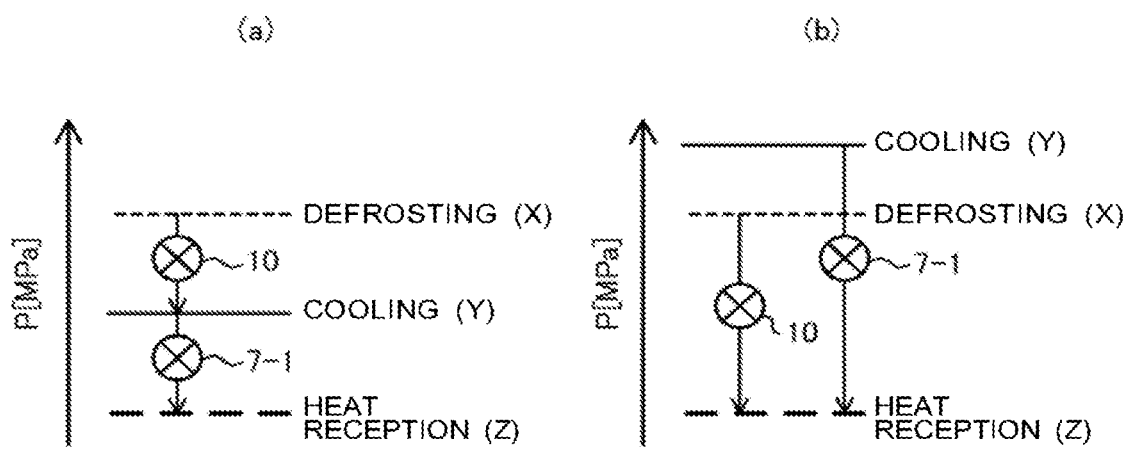
FIG. 18 illustrates a relationship between the pressure of refrigerant for performing defrosting in the parallel heat exchanger 3-2, the pressure of refrigerant for performing cooling in an indoor heat exchanger 11b functioning as an evaporator, and the pressure of refrigerant for receiving heat from outdoor air in a parallel heat exchanger 3-1 in the air-conditioning apparatus 100 according to Embodiment 1.

FIG. 18 illustrates the relationship between the pressure of the refrigerant used for defrosting in the parallel heat exchanger 3-2, the pressure of the refrigerant for cooling in the indoor heat exchanger 11b functioning as an evaporator, and the pressure of the refrigerant for receiving heat from outdoor air in the parallel heat exchanger 3-1 in the air-conditioning apparatus 100 according to Embodiment 1. FIG. 18 schematically illustrates the positional relationship between the flow-rate control device 7-1 and the second expansion device 10. The vertical axis represents the pressure. FIG. 18 (*a*) illustrates the case where the flow-rate control device 7-1 is provided downstream of the outlet of the second expansion device 10, and FIG. 18 (*b*) illustrates the case where the flow-rate control device 7-1 is provided upstream of the outlet of the second expansion device 10. Embodiment 1 corresponds to the case illustrated in FIG. 18 (*b*), in which the flow-rate control device 7-1 is provided upstream of the outlet of the second expansion device 10.

In the case where the flow-rate control device 7-1 is provided downstream of the second expansion device 10 as illustrated in FIG. 18 (*a*), the pressure of the refrigerant which has been used for defrosting is reduced from a "defrosting pressure (X)" by the second expansion device 10. The refrigerant whose pressure has been reduced by the second expansion device 10 joins the refrigerant which has been used for cooling in the indoor unit B, and the pressure thereof becomes equal to the "cooling pressure (Y)", and is then reduced to a "heat receiving pressure (Z)" by the flow-rate control device 7-1. In this case, the "cooling pressure (Y)" can be adjusted only in the range between the "defrosting pressure (X)" and the "heat receiving pressure (Z)". Alternatively, the "defrosting pressure (X)" can be adjusted only to a value above the "cooling pressure (Y)". In other words, the "cooling pressure (Y)" can be adjusted only to a value below the "defrosting pressure (X)".

As described above, the second expansion device 10 adjusts the "defrosting pressure (X)" such that a saturation temperature obtained by converting it falls within the range of approximately 0 to 10 degrees C. Therefore, a saturation temperature obtained by converting the "cooling pressure (Y)", which can be adjusted only to the value below the "defrosting pressure (X)", is lower than the saturation temperature obtained by converting the "defrosting pressure (X)", which is 0 to 10 degrees C. In other words, the saturation temperature of the refrigerant in the indoor heat exchanger 11*b* is lower than 0 to 10 degrees C. Therefore, there is a possibility that the temperature of air to be sent into the indoor space may be excessively lowered to provide excessive coldness, or the indoor temperature is lowered lower than the set temperature, thus worsening the comfortability of the indoor space. It should be noted that the saturation temperature obtained by converting the "cooling pressure (Y)" depending on the set temperature generally falls within the range of approximately 5 to 20 degrees C.

Also, there is a possibility that the saturation temperature of the refrigerant in the indoor heat exchanger 11*b* will lower to 0 degrees C. or below, frosting and freezing will occur in the indoor unit B, air could not be sent into the indoor space or the heat exchanger will be damaged. In the case where defrosting of the indoor unit B is performed to melt the frost and ice, it is necessary to stop cooling, and the indoor space is heated because high-temperature refrigerant is caused to flow through the indoor heat exchanger 11*b*, thus also worsening the comfortability of the indoor space. Furthermore, compared with dew water generated during the normal cooling operation, a larger amount of defrosted water is generated in a shorter time during defrosting. Therefore, unless a drainage capacity of a drainage mechanism, such as a drain pan, is enhanced, the defrosted water may fly off or leak into the indoor space.

In the case where the "cooling pressure (Y)" is adjusted to a pressure corresponding to the set temperature to ensure comfortability of the indoor space which is cooled, the "defrosting pressure (X)" needs to be set to a pressure higher than the "cooling pressure (Y)". In such a case, the heating capacity is reduced, and as a result the comfortability of the indoor space which is heated is reduced.

In contrast, in the case where the flow-rate control device 7-1 is provided upstream of the second expansion device 10 as in Embodiment 1, as illustrated in FIG. 18 (*b*), the pressure of the refrigerant which has been used for defrosting is reduced from the "defrosting pressure (X)" to the "heat receiving pressure (Z)" by the second expansion device 10. Also, the pressure of the refrigerant which has been used for cooling is reduced from the "cooling pressure (Y)" to the "heat receiving pressure (Z)" by the flow-rate control device 7-1. Thus, the "defrosting pressure (X)" and the "cooling pressure (Y)" can be individually adjusted. Therefore, the "defrosting pressure (X)" can be adjusted such that a saturation temperature obtained by converting it falls within the range of approximately 0 to 10 degrees C. to ensure a sufficient heating capacity, and the "cooling pressure (Y)" can be adjusted to cause the saturation temperature obtained by converting it thereon to fall within the range from 0 degrees C. to the set temperature. Therefore, frosting and freezing of the indoor unit B can be prevented, and the indoor temperature can be adjusted. Thus, the comfortability of all the indoor spaces can be improved.

As described above, according to Embodiment 1, the flow-rate control device 7-1 is provided upstream of the second expansion device 10, thereby improving the comfortability of all the indoor spaces which are heated and cooled.

In the configuration in which the parallel heat exchangers 3-1 and 3-2 are combined together and the parallel heat exchanger 3-2 to be defrosted also receives outdoor air sent by the outdoor fan 3*f* as in Embodiment 1, the output of the fan may be changed in accordance with the ratio of the cooling load to the heating load.

In the case where the ratio of the cooling load to the heating load is high, the amount of refrigerant which evaporates in the indoor heat exchanger 11*b* functioning as an evaporator is increased, as compared with the case where the ratio of the cooling load to the heating load is low. That is, the amount of heat received from indoor air in the indoor unit B is increased. Therefore, in the case where the ratio of the cooling load to the heating load is high, the amount of heat received from outdoor air by the parallel heat exchanger 3-1 can be reduced. Therefore, in the case where the ratio of the cooling load to the heating load is higher than a first set ratio which is set in advance, defrosting can be ended more early by reducing the output of the outdoor fan 3*f*, and thus reducing the amount of heat radiated into the air from the parallel heat exchanger 3-2 to be defrosted. Furthermore, in the case where the heating capacity for defrosting is reduced by an amount by which the amount of heat radiated into the air from the parallel heat exchanger 3-2 is reduced, the heating capacity can be enhanced by the amount.

Furthermore, in the heating main defrosting operation, the flow rate of the refrigerant which flows into the parallel heat exchanger 3-2 to be defrosted may be controlled in accordance with the heating load of the indoor heat exchanger 11*c* which functions as a condenser. To be more specific, in the case where the heating load is less than a load set in advance, the opening degree of the first expansion device 8 may be increased to increase the flow rate of the refrigerant which flows into the parallel heat exchanger 3-2. In this case, defrosting can be achieved in a short time. In the case where the flow rate of the refrigerant which flows into the parallel heat exchanger 3-2 is increased, the flow rate of the refrigerant which flows into the parallel heat exchanger 3-1 which functions as an evaporator is reduced. Therefore, the amount of heat received in the main circuit is reduced, and the heating capacity is reduced. However, since the heating load is low, the indoor environment is not affected even when the heating capacity is reduced.

It should be noted that in the switching between the normal heating main operation and the heating main defrosting operation, the opening degree of the flow-rate control device 7-1 may be changed in advance in accordance with the ratio of the cooling load to the heating load. This will be further described.

In the normal heating main operation, the parallel heat exchangers 3-1 and 3-2 both function as evaporators, and the refrigerant which flows out of the backflow preventing device 5-4 and passes through the main circuit is branched into two refrigerants which flow toward the flow-rate control devices 7-1 and 7-2. In the heating main defrosting operation, only the parallel heat exchanger 3-1 functions as an evaporator, and the refrigerant which flows out of the backflow preventing device 5-4 and passes through the main circuit flows only through the flow-rate control device 7-1. When the operation to be performed is switched from the normal heating main operation to the heating main defrosting operation, the area of the outdoor heat exchanger 3 which functions as an evaporator is reduced, and the low pressure thus lowers, as a result of which the pressure of the refrigerant in the indoor heat exchanger 11b lowers. In addition, when the operation is switched from the normal heating main operation to the heating main defrosting operation, all of the refrigerant which passes through the main circuit flows only through the flow-rate control device 7-1. As a result, the pressure of the refrigerant on a side of the flow-rate control device 7-1 into which the refrigerant flows increases, and the pressure of the refrigerant in the indoor heat exchanger 11b increases accordingly.

In such a manner, the pressure of the refrigerant in the indoor heat exchanger 11b rapidly changes for two reasons. One of them is that the area of the outdoor heat exchanger 3 which functions as an evaporator is decreased, thereby lowering the pressure of the refrigerant in the indoor heat exchanger 11b, and the other is that the pressure of the refrigerant in the indoor heat exchanger 11b is raised due to whether or not the refrigerant is branched into refrigerants which flow toward the flow-rate control devices 7-1 and 7-2. Which of the above two causes more greatly influences on the above rapid change of the pressure of the refrigerant in the indoor heat exchanger 11b depends on the ratio of the cooling load to the heating load.

It should be noted that when the operation is switched from the heating main defrosting operation to the normal heating main operation, the above reasons for changing the pressure of the refrigerant are reversed. To be more specific, the pressure of the refrigerant in the indoor heat exchanger 11b changes for two reasons: one of them is that the area of the outdoor heat exchanger 3 which functions as an evaporator is increased, thereby raising the pressure of the refrigerant in the indoor heat exchanger 11b, and the other is that the refrigerant which passes through the main circuit is branched into refrigerants which flows toward the flow-rate control devices 7-1 and 7-2, thereby lowering the pressure of the refrigerant in the indoor heat exchanger 11b.

In the normal heating main operation, in the case where the ratio of the cooling load to the heating load is low, the amount of heat received from outside air by the outdoor heat exchanger 3 is greater than the amount of heat received from indoor air by the indoor heat exchanger 11b in the indoor unit B performing cooling. Therefore, the influence of the change in the area of the outdoor heat exchanger 3 which functions as an evaporator is great. When the operation is switched from the normal heating main operation to the heating main defrosting operation, the area of the outdoor heat exchanger 3 which functions as an evaporator is reduced, and the pressure of the refrigerant in the indoor heat exchanger 11b is reduced accordingly. Therefore, in the case where the operation is switched from the normal heating main operation to the heating main defrosting operation, if the ratio of the cooling load to the heating load is low, the opening degree of the flow-rate control device 7-1 is reduced before switching to the heating main defrosting operation. Thus, lowering of the pressure of the refrigerant in the indoor heat exchanger 11b can be reduced.

By contrast, in the normal heating main operation, in the case where the ratio of the cooling load to the heating load is high, the amount of heat received from outside air by the outdoor heat exchanger 3 is less than the amount of heat received from indoor air by the indoor heat exchanger 11b in the indoor unit B performing cooling. Therefore, the influence of the change in the area of the outdoor heat exchanger 3 which functions as an evaporator is small. When the amount of heat received from indoor air in the indoor unit B performing cooling is increased, the quality of the refrigerant which passes through the main circuit is also increased, and therefore the influence of whether or not refrigerant is branched into refrigerants which flow toward the flow-rate control devices 7-1 and 7-2 becomes greater. Accordingly, when the operation is switched from the normal heating main operation to the heating main defrosting operation, the pressure of the refrigerant in the indoor heat exchanger 11b is increased. Therefore, in the case where the operation is switched from the normal heating main operation to the heating main defrosting operation, if the ratio of the cooling load to the heating load is high, the opening degree of the flow-rate control device 7-1 is increased before switching to the heating main defrosting operation. Thus, raising of the pressure of the refrigerant in the indoor heat exchanger 11b can be reduced.

To summarize, in the case where the operation to be performed is switched from the normal heating main operation to the heating main defrosting operation, the opening degree of the flow-rate control device 7-1 is controlled as follows in accordance with the ratio of the cooling load to the heating load.

(1) In the case where the ratio of the cooling load to the heating load is lower than a second set ratio which is set in advance, the opening degree of the flow-rate control device 7-1 is decreased before switching the operation.

(2) In the case where the ratio of the cooling load to the heating load is higher than the second set ratio set in advance, the opening degree of the flow-rate control device 7-1 is increased before switching the operation.

In the case where the operation to be performed is switched from the heating main defrosting operation to the normal heating main operation, the opening degree of the flow-rate control device 7-1 is controlled as follows in accordance with the ratio of the cooling load to the heating load:

(3) In the case where the ratio of the cooling load to the heating load is lower than the second set ratio set in advance, the opening degree of the flow-rate control device 7-1 is increased before switching the operation.

(4) In the case where the ratio of the cooling load to the heating load is higher than the second set ratio, the opening degree of the flow-rate control device 7-1 is decreased before switching the operation.

By controlling the opening degree of the flow-rate control device 7-1 as described above, it is possible to prevent the pressure of the refrigerant in the indoor heat exchanger 11b from being rapidly changed when the operation mode is switched, and the comfortability of the indoor space can be improved. In the above items (1) to (4), it is described that the opening degree of the flow-rate control device 7-1 is increased or decreased before switching the operation. This description means that the opening degree is increased or decreased to be greater or smaller than the opening degree prior to the above switching. As described above, the opening degree of the flow-rate control device 7-1 before the switching is controlled in accordance with the set temperature of the indoor unit B performing cooling.

As described above, according to Embodiment 1, defrosting can be performed without stopping heating in a simultaneous cooling and heating operation in which cooling and heating are simultaneously carried out. In addition, since the second expansion device 10 and the third expansion flow control device are individually controlled, the comfortability of both the indoor spaces which are cooled and heated can be improved.

Embodiment 2

Figure 19:
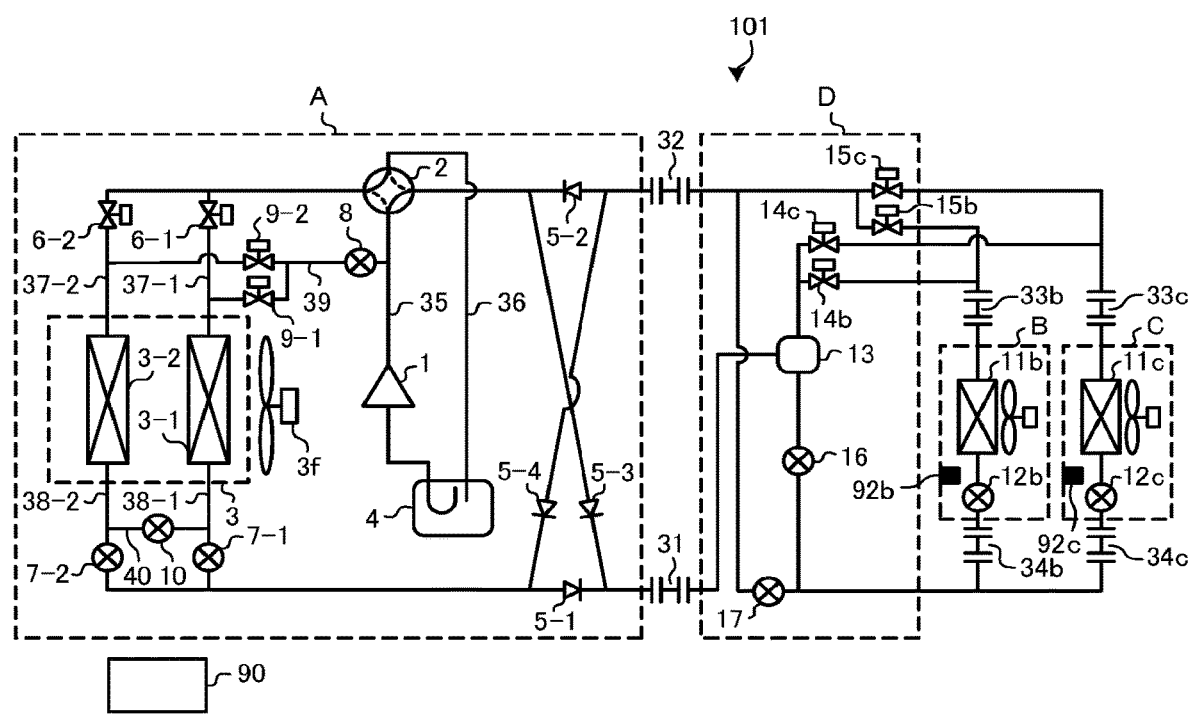
FIG. 19 is a refrigerant circuit diagram illustrating the configuration of a refrigerant circuit of an air-conditioning apparatus 101 according to Embodiment 2 of the present invention.

FIG. 19 is a refrigerant circuit diagram illustrating the configuration of a refrigerant circuit of an air-conditioning apparatus 101 according to Embodiment 2 of the present invention.

Portions and operations of the air-conditioning apparatus 101 which are different from those of Embodiment 1 will be primarily described.

The configuration of the air-conditioning apparatus 101 according to Embodiment 2 is obtained by omitting the refrigerant pressure sensor 91 from the configuration of the air-conditioning apparatus 100 according to Embodiment 1, and adding to the configuration thereof temperature sensors 92b and 92c which measure the temperatures of respective indoor spaces.

The temperature sensors 92b detects the temperature of air which flows into the indoor heat exchanger 11b, and the temperature sensor 92c detects the temperature of air which flows into the indoor heat exchanger 11c. As the temperature sensors 92b and 92c, any sensors may be applied as long as they can detect the temperatures of objects to be cooled. The temperatures of objects to be cooled are not limited to the temperatures of indoor air. For example, as the temperatures of the objects to be cooled, the ambient temperatures of controllers such as remote controls for starting or stopping the operations of the indoor units B and C, changing set temperatures, etc., or the surface temperatures of floors or walls of the indoor spaces may be detected.

It should be noted that the temperature sensors 92b and 92c according to Embodiment 2 correspond to the "temperature detection device" according to the present invention.

[Normal heating main operation]

The difference between the normal heating main operation according to Embodiment 2 and that according to Embodiment 1 will be described. In the description, it is assumed that the indoor unit B performs cooling and the indoor unit C performs heating.

The controller 90 controls the opening degrees of the flow-rate control devices 7-1 and 7-2 such that the indoor temperature detected by the temperature sensor 92b in the indoor unit B performing cooling is adjusted to a set temperature.

When the indoor temperature detected by the temperature sensor 92b is higher than the set temperature, the controller 90 increases the opening degrees of the flow-rate control devices 7-1 and 7-2. Thus, the pressure of the refrigerant in the indoor heat exchanger 11b is reduced to be closer to the pressure of the refrigerant in the parallel heat exchangers 3-1 and 3-2, whereby the saturation temperature of the refrigerant in the indoor heat exchanger 11b is reduced. As a result, the temperature of air which is cooled by the indoor heat exchanger 11b and sent into the indoor space is reduced, and the indoor temperature approaches the set temperature. When the indoor temperature detected by the temperature sensor 92b is lower than the set temperature, the opening degrees of the flow-rate control devices 7-1 and 7-2 are reduced to increase the pressure of the refrigerant in the indoor heat exchanger 11b, whereby the saturation temperature of the refrigerant in the indoor heat exchanger 11b is increased. Thus, the temperature of air which is sent into the indoor space is raised and the indoor temperature approaches the set temperature.

In the case where the difference between the indoor temperature detected by the temperature sensor 92b and the set temperature is greater than a set value, the controller 90 increases the range of changing the opening degrees of the flow-rate control devices 7-1 and 7-2. Thus, the saturation temperature of the refrigerant in the indoor heat exchanger 11b can be greatly changed, as a result of which the indoor temperature can be made closer to the set temperature early. In the case where the difference between the indoor temperature detected by the temperature sensor 92b and the set temperature is less than the set value, the range of changing the opening degrees of the flow-rate control devices 7-1 and 7-2 is reduced. Thus, the value by which the saturation temperature of the refrigerant in the indoor heat exchanger 11b is changed can be made smaller. It is therefore possible to prevent the indoor temperature from being changed by a value greater than the difference between the indoor temperature and the set temperature.

In the case where the indoor unit B performs heating and the indoor unit C performs cooling, the indoor temperature detected by the temperature sensor 92c is used instead of the indoor temperature detected by the temperature sensor 92b.

[Heating main defrosting operation]

The difference between the heating main defrosting operation according to Embodiment 2 and that according to Embodiment 1 will be described. In the description, it is assumed which the parallel heat exchanger 3-2 performs defrosting, the parallel heat exchanger 3-1 functions as an evaporator, the indoor unit B performs cooling, and the indoor unit C performs heating.

The controller 90 controls the opening degree of the flow-rate control device 7-1 such that the indoor temperature detected by the temperature sensor 92b in the indoor unit B performing cooling is adjusted to a set temperature.

In the case where the indoor temperature detected by the temperature sensor 92b is higher than the set temperature, the controller 90 increases the opening degree of the flow-rate control device 7-1. Thus, the pressure of the refrigerant in the indoor heat exchanger 11b is reduced to approach the pressure of the refrigerant in the parallel heat exchanger 3-1, thereby reducing the saturation temperature of the refrigerant in the indoor heat exchanger 11b. As a result, the temperature of air which is cooled by the indoor heat exchanger 11b and sent into the indoor space is reduced, and the indoor temperature approaches the set temperature. In the case where the indoor temperature detected by the temperature sensor 92b is lower than the set temperature, the opening degree of the flow-rate control device 7-1 is reduced to increase the pressure of the refrigerant in the indoor heat exchanger 11b, thereby raising the saturation temperature of the refrigerant in the indoor heat exchanger 11b. Thus, the temperature of air sent into the indoor space is raised and the indoor temperature is prevented from becoming lower than the set temperature.

In the case where the difference between the indoor temperature detected by the temperature sensor 92b and the set temperature is greater than a set value, the controller 90 increases the range of changing the opening degree of the flow-rate control device 7-1. Thus, the saturation temperature of the refrigerant in the indoor heat exchanger 11b can be greatly changed, and the indoor temperature can be made closer to the set temperature early. In the case where the difference between the indoor temperature detected by the temperature sensor 92b and the set temperature is less than the set value, the range of changing the opening degree of the flow-rate control device 7-1 is reduced. Thus, the value by which the saturation temperature of the refrigerant in the indoor heat exchanger 11b can be made smaller. It is therefore possible to prevent the indoor temperature from being changed by a value greater than the difference between the indoor temperature and the set temperature.

In the case where the indoor unit B performs heating and the indoor unit C performs cooling, the indoor temperature detected by the temperature sensor 92c is used instead of the indoor temperature detected by the temperature sensor 92b.

As described above, according to Embodiment 2, the opening degree of one of the flow-rate control devices 7-1 and 7-2 or the opening degrees of both the flow-rate control devices 7-1 and 7-2 are controlled during the normal heating main operation and the heating main defrosting operation. To be more specific, the controller 90 controls the flow-rate control devices 7-1 and 7-2 such that the indoor temperature detected by one of the temperature sensors 92b and 92c which is located in an indoor space to be cooled is adjusted to the set temperature for the indoor space. Accordingly, the temperature of the indoor space to be cooled can be adjusted to the set temperature, and the comfortability of the indoor space can be improved.

Embodiment 3

Figure 20:
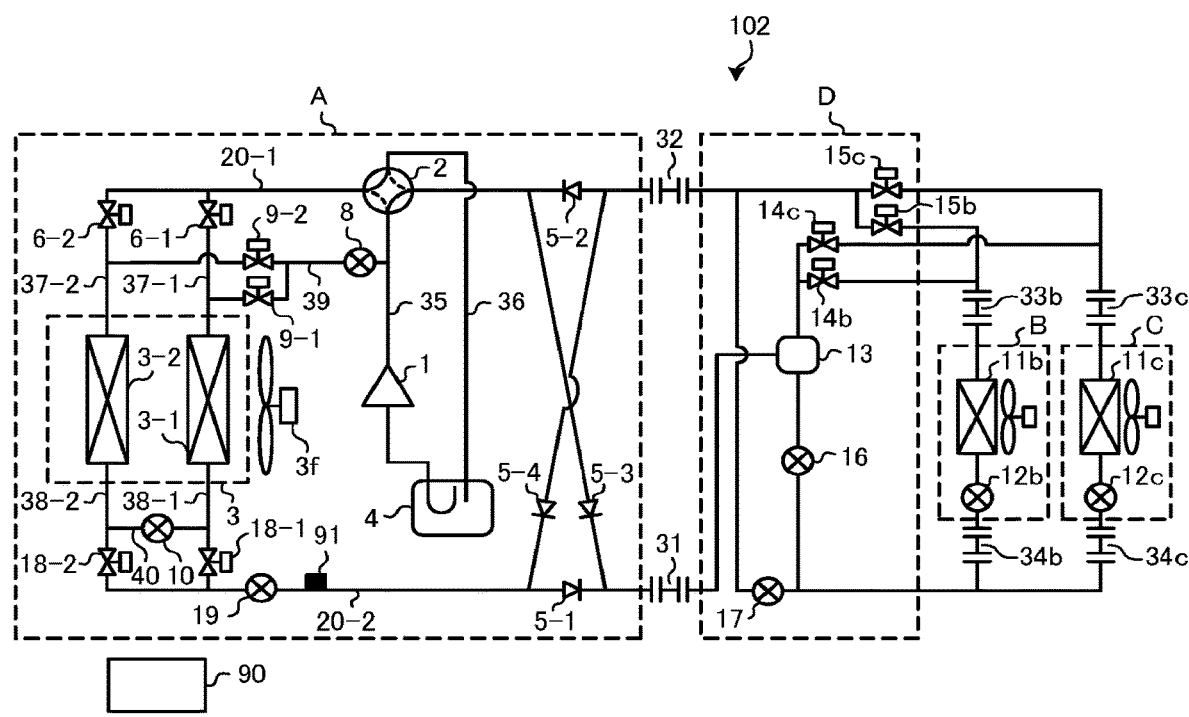
FIG. 20 is a refrigerant circuit diagram illustrating the configuration of a refrigerant circuit of an air-conditioning apparatus 102 according to Embodiment 3 of the present invention.

FIG. 20 is a refrigerant circuit diagram illustrating the configuration of a refrigerant circuit of an air-conditioning apparatus 102 according to Embodiment 3 of the present invention.

Portions and operations of the air-conditioning apparatus 102 which are different from those of Embodiment 1 will be primarily described.

The configuration of the air-conditioning apparatus 102 according to Embodiment 3 is different from that of the air-conditioning apparatus 100 according to Embodiment 1 on the point that in Embodiment 3, third opening-and-closing devices 18-1 and 18-2 are provided in place of the flow-rate control devices 7-1 and 7-2. Furthermore, a third expansion device 19 is additionally provided between the backflow preventing device 5-4 and the third opening-and-closing devices 18-1 and 18-2 and between the refrigerant pressure sensor 91 and the third opening-and-closing devices 18-1 and 18-2.

The third opening-and-closing devices 18-1 and 18-2 in combination with the third expansion device 19, according to Embodiment 3, correspond to the "flow control device" according to the present invention.

In Embodiment 3, in both the cooling only operation mode and the cooling main operation mode, the third opening-and-closing devices 18-1 and 18-2 are opened and the third expansion device 19 is fully opened. Therefore, the refrigerant from the parallel heat exchanger 3-1 and that from the parallel heat exchanger 3-2 pass through the third opening-and-closing devices 18-1 and 18-2 and join each other. The resultant refrigerant obtained by the above joining passes through the third expansion device 19 and flows into the backflow preventing device 5-1. Since the third expansion device 19 is fully opened, the refrigerant is hardly reduced in pressure, and hardly expanded.

In Embodiment 3, in the normal heating only operation, the third opening-and-closing devices 18-1 and 18-2 are opened, and the opening degree of the third expansion device 19 is set to a constant opening degree. Thus, after flowing out of the backflow preventing device 5-4, the refrigerant is expanded and reduced in pressure by the third expansion device 19, and is then branched into refrigerants, which flow into the third opening-and-closing devices 18-1 and 18-2.

It should be noted that the third expansion device 19 may be controlled such that the opening degree thereof is constant, for example, it is kept in a fully opened state, or be controlled such that the saturation temperature at an intermediate pressure in, for example, the second extension pipe 32 which is detected by the refrigerant pressure sensor 91 falls within the range of approximately 0 to 20 degrees C. By controlling the saturation temperature at the intermediate pressure in, for example, the second extension pipe 32, dew condensation on the pipe surface or freezing of the pipe surface can be prevented.

The difference between the normal heating main operation according to Embodiment 3 and that according to Embodiment 1 will be described. In the description, it is assumed that the indoor unit B performs cooling and the indoor unit C performs heating.

The third opening-and-closing devices 18-1 and 18-2 are opened, and the third expansion device 19 is also opened. The refrigerant which flows out of the backflow preventing device 5-4 is expanded and reduced in pressure by the third expansion device 19, and is then branched into two refrigerants, which flow into the third opening-and-closing devices 18-1 and 18-2.

The controller 90 controls the opening degree of the third expansion device 19 such that the pressure detected by the refrigerant pressure sensor 91, that is, the pressure of the refrigerant in the indoor heat exchanger 11b functioning as an evaporator, is adjusted to a target pressure which is determined in accordance with, for example, the set temperature. Thus, the saturation temperature of the refrigerant in the indoor heat exchanger 11b performing cooling can be adjusted, and the temperature of air which is cooled by the indoor heat exchanger 11b and sent into the indoor space can be adjusted accordingly. Thus, the operation can be performed in accordance with the set temperature for the indoor space and load, and the comfortability of the indoor space can be improved.

The difference between the heating main defrosting operation according to Embodiment 3 and that according to Embodiment 1 will be described. In the description, it is assumed which the parallel heat exchanger 3-2 performs defrosting, the parallel heat exchanger 3-1 functions as an evaporator, the indoor unit B performs cooling, and the indoor unit C performs heating.

The third opening-and-closing device 18-1 is opened, and the third expansion device 19 is also opened. The refrigerant which flows out of the backflow preventing device 5-4 is expanded and reduced in pressure by the third expansion device 19, and flows only into the third opening-and-closing device 18-1. The third opening-and-closing device 18-2 is closed to stop flowing of the refrigerant from the backflow preventing device 5-4 into the parallel heat exchanger 3-2 to be defrosted.

The controller 90 controls the opening degree of the third expansion device 19 such that the pressure detected by the refrigerant pressure sensor 91, that is, the pressure of the refrigerant in the indoor heat exchanger 11*b* functioning as an evaporator, is adjusted to a target pressure which is determined in accordance with, for example, the set temperature. Thus, the saturation temperature of the refrigerant in the indoor heat exchanger 11*b* performing cooling can be adjusted, and the temperature of air which is cooled by the indoor heat exchanger 11*b* and sent into the indoor space can be adjusted accordingly. Thus, the operation can be performed in accordance with the set temperature for the indoor space and load, and the comfortability of the indoor space can be improved.

In the heating main defrosting operation according to Embodiment 3, the opening degree of the third expansion device 19 is controlled to adjust the pressure of the refrigerant in the indoor heat exchanger 11*b* functioning as an evaporator, whichever of the parallel heat exchangers 3-1 and 3-2 is defrosted.

As described above, in the normal heating main operation and the heating main defrosting operation according to Embodiment 3, the pressure of the refrigerant in one of the indoor heat exchangers 11*b* and 11*c* which functions as an evaporator is controlled only by the third expansion device 19. Therefore, the number of valves whose opening degrees can be controlled and which are used to adjust the flow rate and pressure of the refrigerant can be reduced. To be more specific, in Embodiment 2 illustrated in FIG. 19, three valves, which are the flow-rate control devices 7-1 and 7-2 and the second expansion device 10, are required. In contrast, in Embodiment 3 as illustrated in FIG. 20, only the second expansion device 10 and the third expansion device 19 are used, and the number of valves is thus reduced to two.

Although the number of valves whose opening degrees can be controlled is reduced, the number of opening-and-closing devices is increased to two. However, the opening-and-closing devices are often more inexpensive than the valves whose opening degrees can be controlled. Therefore, it can be expected that even if the number of opening-and-closing devices is increased, the cost can be reduced by reducing the number of valves whose opening degrees can be controlled. In addition, the control can be simplified.

Since the third expansion device 19 is provided upstream of the second expansion device 10, as described above with reference to FIG. 18, the pressure of the parallel heat exchanger 3-1 or 3-2 which performs defrosting and the pressure of the indoor heat exchanger 11*b* or 11*c* which performs cooling can be individually adjusted.

It should be noted that Embodiments 1, 2 and 3 are described above by referring to the case where the outdoor heat exchanger 3 is divided into two parallel heat exchangers 3-1 and 3-2. However, the present invention is not limited to such a case. If the above concept of the invention is applied to a configuration including three or more parallel heat exchangers, it is possible to subject one or more of the parallel heat exchangers to defrosting, and operate the other parallel heat exchanger or exchangers such that it or they continue the heating operation.

Also, Embodiment 1, 2 and 3 are described above by referring to the case where two indoor heat exchangers are provided. However, the present invention is not limited to such a case. If the above concept of the invention is applied to a construction including three or more indoor units, the pressure of the refrigerant in a parallel heat exchanger to be defrosted and the pressure of the refrigerant in an indoor heat exchanger which functions as an evaporator can be individually adjusted.

REFERENCE SIGNS LIST

1 compressor 2 flow switching device 3 outdoor heat exchanger 3-1 parallel heat exchanger 3-2 parallel heat exchanger 3*a* heat transfer tube 3*b* fin 3*f* outdoor fan 4 accumulator 5-1 backflow preventing device 5-2 backflow preventing device 5-3 backflow preventing device 5-4 backflow preventing device 6-1 first opening-and-closing device 6-2 first opening-and-closing device 7-1 flow-rate control device 7-2 flow-rate control device 8 first expansion device 9-1 second opening-and-closing device 9-2 second opening-and-closing device 10 second expansion device 11*b* indoor heat exchanger 11*c* indoor heat exchanger 12*b* indoor flow-rate control device 12*c* indoor flow-rate control device 13 gas-liquid separation device 14*b* first relay opening-and-closing device 14*c* first relay opening-and-closing device 15*b* second relay opening-and-closing device 15*c* second relay opening-and-closing device 16 first relay flow-rate control device 17 second relay flow-rate control device 18-1 third opening-and-closing device 18-2 third opening-and-closing device 19 third expansion device 20-1 pipe 20-2 pipe 31 first extension pipe 32 second extension pipe 33*b* third extension pipe 33*c* third extension pipe 34*b* fourth extension pipe 34*c* fourth extension pipe 35 discharge pipe 36 suction pipe 37-1 first connection pipe 37-2 first connection pipe 38-1 second connection pipe 38-2 second connection pipe 39 first defrosting pipe 40 second defrosting pipe 90 controller 91 refrigerant pressure sensor 92*b* temperature sensor 92*c* temperature sensor 100 air-conditioning apparatus 101 air-conditioning apparatus 102 air-conditioning apparatus A outdoor unit B indoor unit C indoor unit D relay device X connection point

The invention claimed is:

1. An air-conditioning apparatus, comprising:
  a main circuit including a compressor, a plurality of indoor heat exchangers, a plurality of pressure reducing devices, and an outdoor heat exchanger which are successively connected by pipes, the outdoor heat exchanger including a plurality of parallel heat exchangers;
  a first defrosting pipe branching off from the main circuit to supply a portion of refrigerant discharged from the compressor to one of the parallel heat exchangers which is to be defrosted;
  a first expansion device provided at the first defrosting pipe;
  a second defrosting pipe configured to return, to the main circuit, the refrigerant supplied through the first defrosting pipe to the parallel heat exchanger to be defrosted;
  a first flow switching device configured to switch connection of each of the parallel heat exchangers on an end side thereof which is connected to the compressor, between connection to the first defrosting pipe and connection to the main circuit;

a second expansion device provided on the second defrosting pipe, and configured to adjust a pressure of the refrigerant in the parallel heat exchanger to be defrosted;

a flow control device provided between a connection point between an outlet of the second defrosting pipe and the main circuit and at least one of the indoor heat exchangers which function as evaporators, the flow control device being configured to switch connection of each of the parallel heat exchangers on an opposite end side of the end side connected to the compressor, between connection to the second defrosting pipe and connection to the main circuit, and adjust a pressure of the refrigerant in the at least one of the indoor heat exchangers which function as the evaporators; and a controller configured to control the first expansion device, the second expansion device, and the flow control device, wherein the controller controls the second expansion device and the flow control device individually in a first operation in which: a portion of the refrigerant discharged from the compressor is guided through the first defrosting pipe and the second defrosting pipe to pass through the parallel heat exchanger to be defrosted; at least one of the parallel heat exchangers, which are other than the parallel heat exchanger to be defrosted, are caused to function as evaporators; and at least one of the indoor heat exchangers are caused to function as evaporators, and an other at least one of the indoor heat exchangers are caused to function as condensers, and also in the first operation, the controller controls the first expansion device based on a heating load of the other one or other ones of the indoor heat exchangers which function as the condensers.

2. The air-conditioning apparatus of claim 1, wherein in the first operation, the controller increases an opening degree of the first expansion device when the heating load is less than a set load set in advance.

3. An air-conditioning apparatus, comprising:

a main circuit including a compressor, a plurality of indoor heat exchangers, a plurality of pressure reducing devices, and an outdoor heat exchanger which are successively connected by pipes, the outdoor heat exchanger including a plurality of parallel heat exchangers;

a first defrosting pipe branching off from the main circuit to supply a portion of refrigerant discharged from the compressor to one of the parallel heat exchangers which is to be defrosted;

a first expansion device provided at the first defrosting pipe;

a second defrosting pipe configured to return to the main circuit, the refrigerant supplied through the first defrosting pipe to the parallel heat exchanger to be defrosted;

a first flow switching device configured to switch connection of each of the parallel heat exchangers on an end side thereof which is connected to the compressor, between connection to the first defrosting pipe and connection to the main circuit;

a second expansion device provided on the second defrosting pipe, and configured to adjust a pressure of the refrigerant in the parallel heat exchanger to be defrosted;

a flow control device provided between a connection point between an outlet of the second defrosting pipe and the main circuit and at least one of the indoor heat exchangers which function as evaporators, the flow control device being configured to switch connection of each of the parallel heat exchangers on an opposite end side of the end side connected to the compressor, between connection to the second defrosting pipe and connection to the main circuit, and adjust a pressure of the refrigerant in the at least one of the indoor heat exchangers which function as the evaporators; and a controller configured to control the first expansion device, the second expansion device, and the flow control device, wherein the controller controls the second expansion device and the flow control device individually in a first operation in which: a portion of the refrigerant discharged from the compressor is guided through the first defrosting pipe and the second defrosting pipe to pass through the parallel heat exchanger to be defrosted; at least one of the parallel heat exchangers, which are other than the parallel heat exchanger to be defrosted, are caused to function as evaporators; and at least one of the indoor heat exchangers are caused to function as evaporators, and an other at least one of the indoor heat exchangers are caused to function as condensers, and when the first operation is changed to a second operation in which: all the parallel heat exchangers function as evaporators; and at least one of the indoor heat exchangers function as evaporators and an other at least one of the indoor heat exchangers function as condensers, or when the second operation is switched to the first operation, the controller controls the flow control device based on a ratio of a cooling load of the at least one of the indoor heat exchangers which function as the evaporators to a heating load of the other at least one of the indoor heat exchangers which function as the condensers.

4. The air-conditioning apparatus of claim 3, wherein when performing switching from the first operation to the second operation, when the ratio is lower than a second set ratio which is set in advance, the controller reduces an opening degree of the flow control device in advance before the switching, and when the ratio is higher than the second set ratio, the controller increases the opening degree of the flow control device in advance before the switching, and wherein when performing switching from the second operation to the first operation, when the ratio is lower than the second set ratio, the controller increases the opening degree of the flow control device in advance before the switching, and when the ratio is higher than the second set ratio, the controller reduces the opening degree of the flow control device in advance before the switching.

5. The air-conditioning apparatus of claim 1, wherein the controller controls the flow control device based on a set temperature for an indoor space where the at least one of the indoor heat exchangers which function as the evaporators in the first operation are provided.

6. The air-conditioning apparatus of claim 5, further comprising:

a pressure detection device configured to detect a pressure of the refrigerant in the at least one of the indoor heat exchangers which function as the evaporators in the first operation, wherein the controller controls the flow control device to cause the pressure of the refrigerant detected by the pressure detection device to reach a target pressure determined in accordance with the set temperature.

7. The air-conditioning apparatus of claim 6, wherein if the target pressure is converted into a saturation temperature, the saturation temperature is higher than or equal to 0 degrees C. and lower than or equal to the set temperature.

8. The air-conditioning apparatus of claim 5, further comprising:
- a temperature detection device configured to detect a temperature of an object to be cooled by the one or ones of the indoor heat exchangers which function as the evaporators,
- wherein the controller controls the flow control device based on a relationship in magnitude between the temperature detected by the temperature detection device and the set temperature.

9. The air-conditioning apparatus of claim 8, wherein the controller increases an opening degree of the flow control device when the temperature detected by the temperature detection device is higher than the set temperature, and decreases the opening degree of the flow control device when the temperature detected by the temperature detection device is lower than the set temperature.

10. The air-conditioning apparatus of claim 1, further comprising:
- a fan configured to send outside air to the parallel heat exchangers,
- wherein the controller controls an output of the fan based on a ratio of a cooling load of the at least one of the indoor heat exchangers which function as the evaporators to a heating load of the other at least one of the indoor heat exchangers which function as the condensers in the first operation.

11. The air-conditioning apparatus of claim 10, wherein the controller reduces the output of the fan when the ratio is higher than a first set ratio which is set in advance.

* * * * *